(12) United States Patent
Fire

(10) Patent No.: US 10,345,026 B2
(45) Date of Patent: Jul. 9, 2019

(54) BEVERAGE DISPENSING COOLER

(71) Applicant: David J Fire, Duluth, GA (US)

(72) Inventor: David J Fire, Duluth, GA (US)

(*) Notice: Subject to any disclaimer, the term of this patent is extended or adjusted under 35 U.S.C. 154(b) by 38 days.

(21) Appl. No.: 15/677,937

(22) Filed: Aug. 15, 2017

(65) Prior Publication Data

US 2017/0370629 A1 Dec. 28, 2017

Related U.S. Application Data

(63) Continuation-in-part of application No. 11/875,109, filed on Oct. 19, 2007.

(Continued)

(51) Int. Cl.
*F25D 3/08* (2006.01)
*F25D 25/02* (2006.01)
(Continued)

(52) U.S. Cl.
CPC ............ *F25D 3/08* (2013.01); *B60B 15/10* (2013.01); *B67D 1/0084* (2013.01); *B67D 1/0086* (2013.01); *B67D 1/0412* (2013.01); *B67D 1/0418* (2013.01); *B67D 1/0844* (2013.01); *B67D 1/0857* (2013.01); *B67D 1/0869* (2013.01); *B67D 1/0874* (2013.01); *F25D 3/06* (2013.01); *F25D 21/14* (2013.01); *F25D 25/021* (2013.01); *F25D 31/006* (2013.01); *B60B 2900/351* (2013.01); *B60B 2900/551* (2013.01); *B67D 1/0829* (2013.01);
(Continued)

(58) Field of Classification Search
CPC .......... F25D 3/08; F25D 21/14; F25D 25/021; F25D 31/006; F25D 3/06; F25D 2303/081; F25D 2303/0844; F25D 2303/0845; F25D 2331/806; F25D 2400/38; B60B 15/10; B60B 2900/351; B60B 2900/551; Y02A 40/968; B67D 1/0084; B67D 1/0086; B67D 1/0412; B67D 1/0418; B67D 1/0844; B67D 1/0857; B67D 1/0869; B67D 1/0874; B67D 1/0829; B67D 2210/0006; B67D 2210/00128; B67D 2210/00133
USPC .......... 222/400.7, 399, 608–610, 612, 146.6, 222/145.5–145.6; 62/235.1, 236, 237, 62/265, 371, 389–390, 440–441, 457.1, 62/457.7, 457.9
See application file for complete search history.

(56) References Cited

U.S. PATENT DOCUMENTS

| | | | |
|---|---|---|---|
| 2,924,486 A | * | 2/1960 | Blaschke ............... B60B 15/26 301/48 |
| 4,673,108 A | * | 6/1987 | de Man ............... B67D 1/0084 200/5 A |

(Continued)

*Primary Examiner* — Paul R Durand
*Assistant Examiner* — Andrew P Bainbridge

(57) ABSTRACT

Disclosed is a beverage dispensing cooler. The beverage dispensing cooler includes a first lid, a second lid, a body, an axle, a handle and multiple hoses. The body includes a chamber, a panel, a base valve, a wall drain, a primary hose, a flow control unit, a power unit and a dispenser gun. The chamber includes multiple cylinders, multiple pressure compartments and a basin configured to collect water from condensation and melted ice. The axle further includes multiple wheels, a rod and multiple bearings connected to the rod and to the multiple wheels. The handle is configured to facilitate engagement of the beverage dispensing cooler with a hand of a user.

14 Claims, 23 Drawing Sheets

Related U.S. Application Data

(60) Provisional application No. 62/374,956, filed on Aug. 15, 2016, provisional application No. 60/853,175, filed on Oct. 20, 2006.

(51) Int. Cl.
  *F25D 21/14* (2006.01)
  *B67D 1/04* (2006.01)
  *B67D 1/00* (2006.01)
  *B67D 1/08* (2006.01)
  *B60B 15/10* (2006.01)
  *F25D 31/00* (2006.01)
  *F25D 3/06* (2006.01)

(52) U.S. Cl.
  CPC ........... *B67D 2210/0006* (2013.01); *B67D 2210/00128* (2013.01); *B67D 2210/00133* (2013.01); *F25D 2303/081* (2013.01); *F25D 2303/0844* (2013.01); *F25D 2303/0845* (2013.01); *F25D 2331/806* (2013.01); *F25D 2400/38* (2013.01); *Y02A 40/968* (2018.01)

(56) References Cited

U.S. PATENT DOCUMENTS

| | | | |
|---|---|---|---|
| 4,836,414 A * | 6/1989 | Credle, Jr. | B67D 1/04 137/212 |
| 4,986,449 A * | 1/1991 | Valiyee | B67D 1/0084 137/606 |
| 5,529,220 A * | 6/1996 | Credle, Jr. | B67D 1/04 221/96 |
| 6,305,185 B1 * | 10/2001 | Sloan | A45C 5/14 62/235.1 |
| 6,364,329 B1 * | 4/2002 | Holub | A45C 5/14 280/47.26 |
| 6,386,409 B1 * | 5/2002 | Cheney | B60R 9/00 220/525 |
| 6,502,656 B2 * | 1/2003 | Weiss | A45C 5/14 180/168 |
| 6,990,831 B2 * | 1/2006 | Fiene | F25D 3/08 62/457.1 |
| 7,815,079 B2 * | 10/2010 | Saveliev | B67D 1/0006 141/392 |
| 7,931,382 B2 * | 4/2011 | Hecht | B67D 1/0084 239/526 |
| 7,980,409 B2 * | 7/2011 | Vasko | B60R 7/04 220/326 |
| 8,459,819 B2 * | 6/2013 | Martindale | B67D 1/0084 362/101 |
| 8,733,577 B2 * | 5/2014 | Patterson | A45F 3/46 206/192 |
| 8,839,965 B2 * | 9/2014 | Benneche | A47B 96/021 211/134 |
| 9,352,287 B2 * | 5/2016 | Snider | A47J 31/407 |
| 9,976,789 B2 * | 5/2018 | Grepper | F25D 3/08 |
| 2008/0093384 A1 * | 4/2008 | Fire | B67D 1/0084 222/144.5 |
| 2008/0173705 A1 * | 7/2008 | Girard | A47J 31/402 235/375 |
| 2008/0245793 A1 * | 10/2008 | Hanson | A45C 11/20 220/263 |
| 2010/0126196 A1 * | 5/2010 | McCance | A45C 11/20 62/264 |
| 2010/0275641 A1 * | 11/2010 | Manner | A63B 63/08 62/457.1 |
| 2011/0151740 A1 * | 6/2011 | Ducrocq | A61F 7/10 442/414 |
| 2013/0056478 A1 * | 3/2013 | Canales, Jr. | F25D 3/06 220/592.03 |
| 2013/0081885 A1 * | 4/2013 | Connor | A61G 5/06 180/8.2 |
| 2013/0207360 A1 * | 8/2013 | Vanderberg | A45C 5/14 280/30 |
| 2014/0157794 A1 * | 6/2014 | McGann | F25B 21/04 62/3.2 |
| 2015/0114024 A1 * | 4/2015 | Grepper | F25D 23/00 62/320 |
| 2015/0159938 A1 * | 6/2015 | Weckerly | F25D 23/12 381/334 |

* cited by examiner

SIDE VIEW

ILLUMINATION

PERSPECTIVE VIEW

BEVERAGE DISPENSING COOLER

The current application claims a priority to the U.S. Provisional Patent application Ser. No. 62/374,956 filed on Aug. 15, 2016.

FIELD OF THE INVENTION

The present invention relates generally to coolers. In particular, the present invention relates to a cooler containing drinks with a pressure-based mechanism for dispensing.

BACKGROUND OF THE INVENTION

Coolers are used by many to keep beverages and snacks cool in any conditions. Often considered essential equipment by tailgaters, campers, hunters, fishermen, as well as in any situation that requires the cooling of beverages in general, such as on planes or in bars, the cooler allows a user to protect an item or items from exposure to conditions that are hot or otherwise undesirable. A cooler user may place ice or ice packs within a cooler in order to lower the temperature of the contained area, then add several beverages or other items to be kept cold, before closing the lid and transporting the cooler to a new location. The items would remain chilled during transportation.

However, available coolers have several drawbacks. As ice, ice packs, and objects are added to the cooler, the weight of the cooler quickly increases. This hinders the ability of the user to transport the cooler from location to location. Coolers are necessarily large and bulky in order to transport large quantities of items, and generally utilize handles to facilitate transportation. The handles, however, do not help a user when the cooler contents are particularly dense or heavy, as is the case for transporting beverages in heavy containers. Even coolers equipped with sets of wheels are not truly enabled to move the cooler with convenience, as the wheels often do not come with a convenient handle to provide appropriate leverage to the cooler. The wheels of such coolers are rarely adapted to a variety of conditions, making them less than useful when traveling over sand, ice, mud, and other loose surfaces. In addition, coolers grow even heavier as condensation and ice melting cause water to collect within the cooler container. The melting of ice and collection of condensation also has the undesirable effect of making all of the contained items damp, which makes it more difficult for a user to bring snack items that are open or otherwise vulnerable to spoilage by water exposure. As the melting increases, if the user has not packed enough ice, the ability of the cooler to keep products cool decreases, resulting in potentially warm or spoiled items. Once a user arrives with the heavy cooler, the user must locate all of the items one by one before removing them, a task made more difficult by the presence of ice packs, water, and other items. This may be even more difficult for a user at night, when the darkness makes it difficult to read labels and distinguish between cans or bags of food. When a user opens a bottle of soda or a can of beer, the carbonation decreases, and the user has to drink the beverage quickly in order to ensure beverage quality.

What is needed is a cooler that is easy to transport regardless of conditions or weight. What is further needed is a cooler that can collect and dispense water resulting from melted ice and condensation as a means of reducing the weight of the cooler, while efficiently providing the user or users the resultant fresh, cold water. Further, a cooler that can assist in the selection and dispensing of beverages in any lighting conditions is also beneficial. A cooler that can separate snacks and food from liquids, and that can simultaneously extend the carbonated life of beverages once opened, is also needed. A cooler with a conveniently renewable energy supply that can be used to power electronic devices would further be of great use to a user who is in need of such electric power.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some aspects, a beverage dispensing cooler is disclosed. The beverage dispensing cooler includes a first lid, a second lid, a body, an axle, a handle and multiple hoses. The body includes a chamber, a panel, a base valve, a wall drain, a primary hose, a flow control unit, a power unit and a dispenser gun. The chamber includes multiple cylinders, multiple pressure compartments and a basin configured to collect water from condensation and melted ice. The base valve includes an opening with an adjustable closure configured to connect the basin to an exterior of the beverage dispensing cooler. The wall drain is configured to allow accumulated water to flow from each of the first lid and the second lid into the basin. The axle includes multiple wheels, a rod configured to connect the multiple wheels together, wherein the rod runs through a width of the body. Further, the axle includes multiple bearings connected to the rod and to the multiple wheels, wherein the multiple bearings are configured to allow the multiple wheels to turn independently of each other. The handle is configured to facilitate engagement of the beverage dispensing cooler with a hand of a user.

According to some aspects, the present disclosure provides a beverage Dispensing Cooler that helps a user transport and dispense cool, carbonated beverages conveniently in any conditions. Among the primary goals of the present disclosure are to sustain a dry cooling environment, to allow a user to contain snack items as well as beverages, and to provide a user with a convenient device charging unit.

According to further aspects, the beverage dispensing cooler has an extendable handle and wheels that allow a user to easily and comfortably transport the beverage dispensing cooler from place to place. The wheels have retractable spikes that extend at the will of the user for increased traction over unstable or slippery surfaces. The beverage dispensing cooler has a device-charging panel with several charging inputs that is powered by solar panels on the lid. The lid separates into different sections, providing a user with unique storage areas for ice, snacks, and beverages. The different sections come in different sizes to accommodate a greater or smaller amount of ice and snacks. The snack and ice sections are surrounded by a cooling gel that cools the contents of the section without getting them wet. Similarly, the primary storage area contains several cylinders which are surrounded with cooling gel. These cylinders are designed to hold two-liter bottles of soda as well as five-liter mini-kegs, keeping them cool and allowing for them to be attached to carbon dioxide tanks, while simultaneously allowing plenty of space for ice. The carbon dioxide tanks are included in compartments in the primary storage area, and allow for extended carbonation of the soda or beer contained, even after the bottles or mini-kegs have been opened. The beverage dispensing cooler utilizes a pressure system with a dispenser gun that facilitates the transfer of beverages from the primary storage area to a cup or container for consumption. The cylinders of the primary storage area are equipped with caps that are easy to add and remove, and which are used to adapt the cylinders and contained beverages within to the pressure system and dispenser. The caps can also be used to regulate the pressure within the beverages, as a means of further controlling carbonation. The retractable dispensing gun is equipped with buttons to control beverage selection, LEDs to help the user see the buttons, and a primary light that can be used as a flashlight to locate items contained in the compartments of the lid. A basin at the bottom of the cooler gathers water from condensation that collects in the lid and the primary storage area, and has a dispenser that allows for drainage or dispensing at the will of the user. The beverage dispensing cooler has chambers within the walls that facilitate the removal of water from the storage areas.

According to further aspects, the disclosed cooler has compartments for snacks, and solar panels to provide energy. The dispensing gun has LEDs that illuminate the buttons and the cup to be filled. The main cooler body has cylinders that keep two-liter bottles of soda or five-liter mini-kegs cold, and CO2 tanks to keep soda and beer containers carbonated after they have been opened. A basin within the container collects water that has melted from ice in various areas of the cooler, so cold areas do not flood with water.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
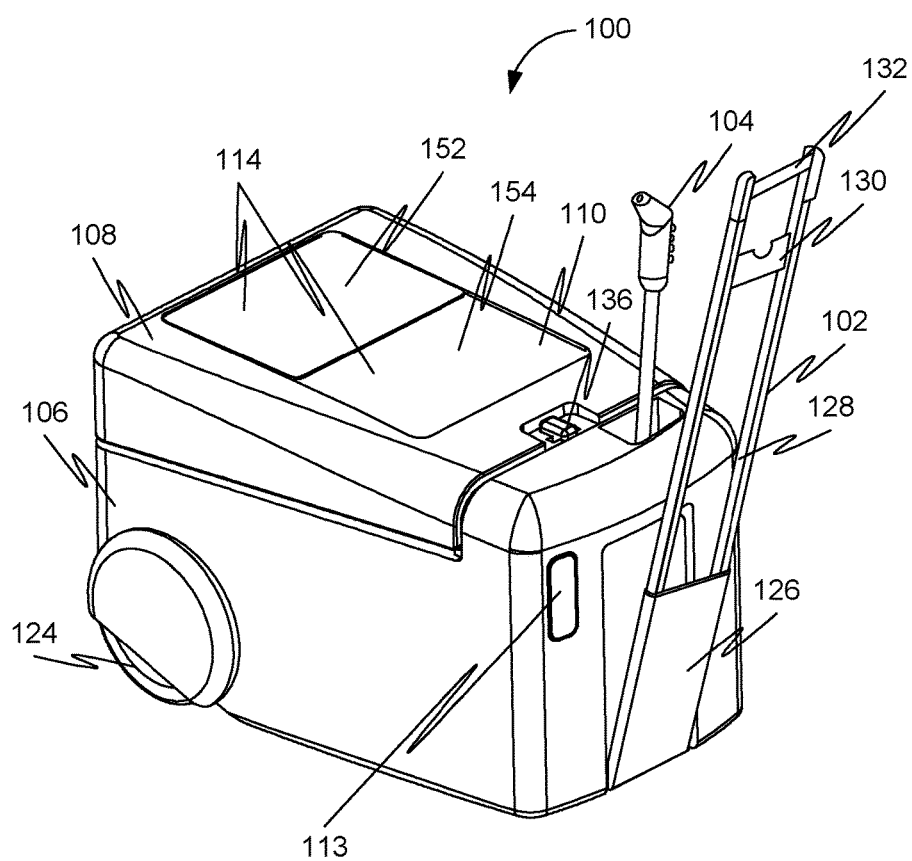
FIG. 1 is a perspective view of a beverage dispensing cooler with extended handle and dispensing gun in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of provisioning beverage dispensing cooler, embodiments of the present disclosure are not limited to use only in this context.

Figure 2:
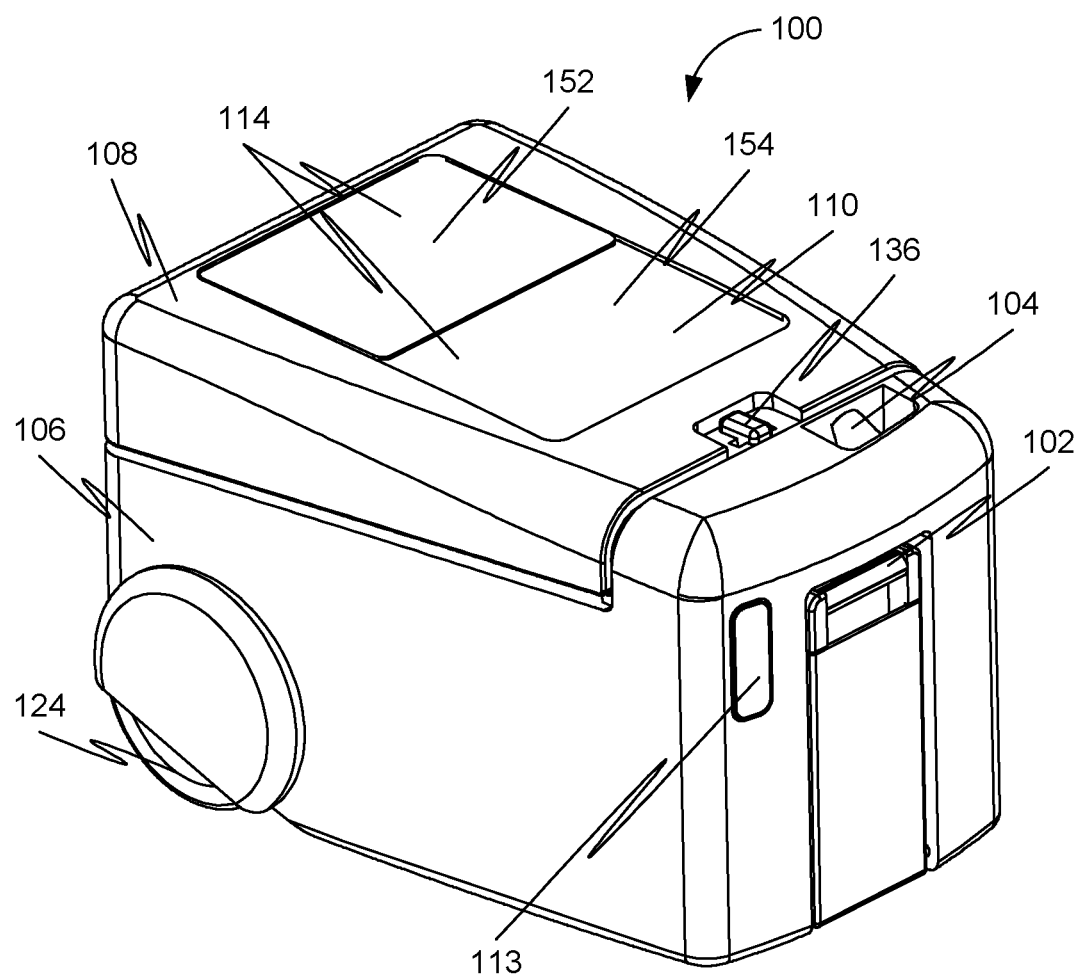
FIG. 2 is a perspective view of the beverage dispensing cooler with the retracted handle and dispensing gun, in accordance with some embodiments.
Figure 3:
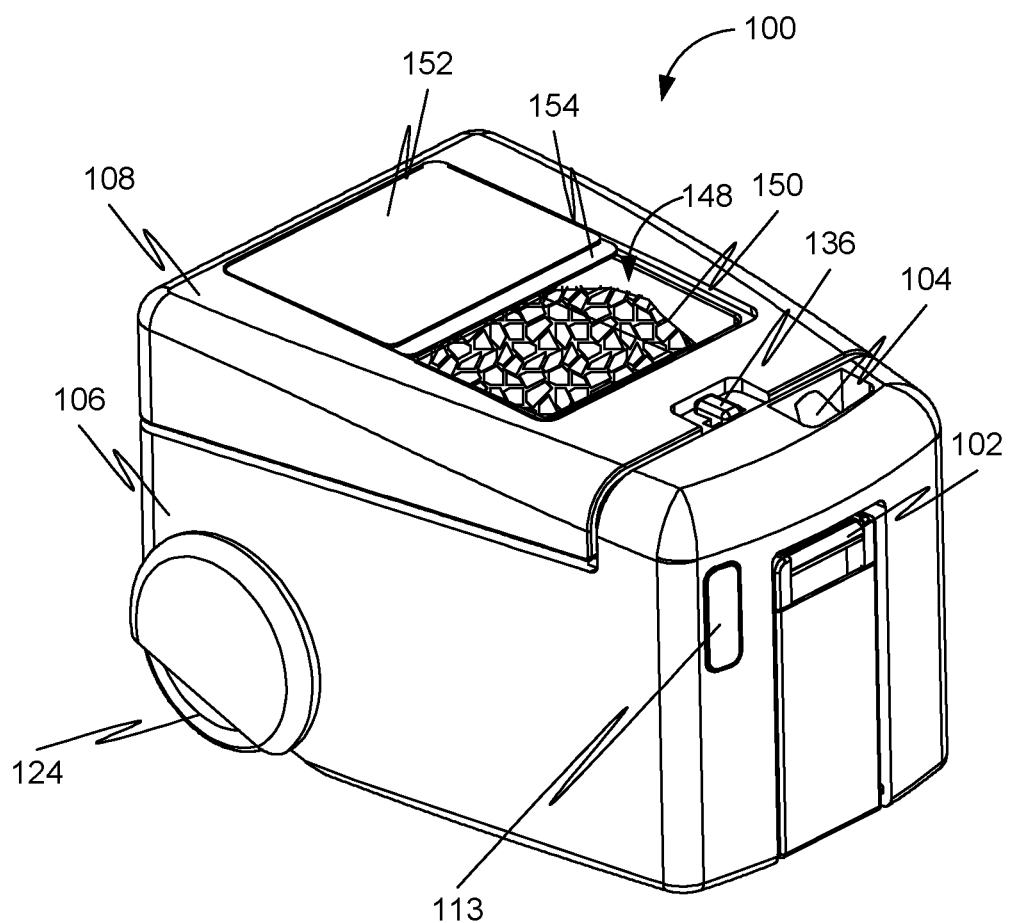
FIG. 3 is a perspective view of the beverage dispensing cooler with a second lid in open position, in accordance with some embodiments.
Figure 6:
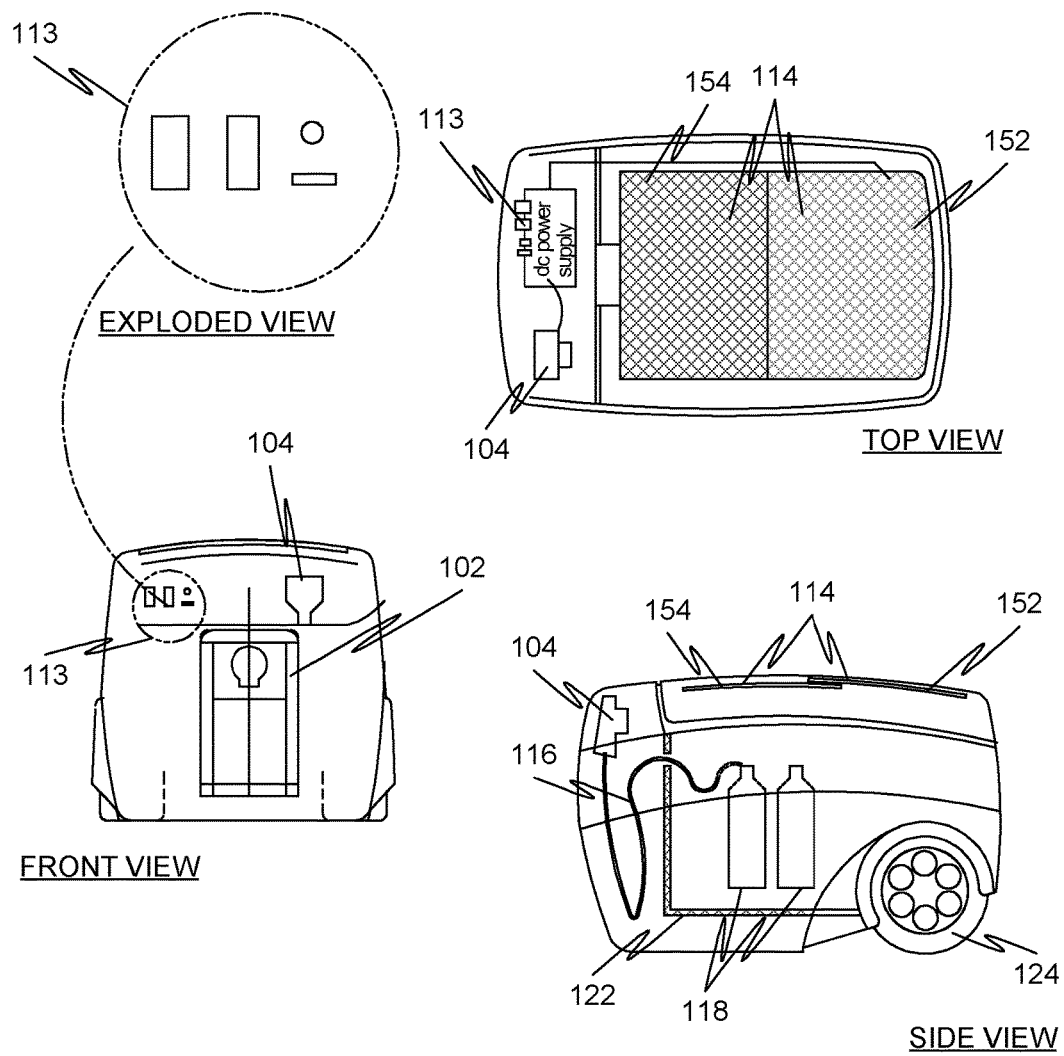
FIG. 6 shows a top view, a front view, a side view of the beverage dispensing cooler along with an exploded front view of the power panel, in accordance with some embodiments.
Figure 12:
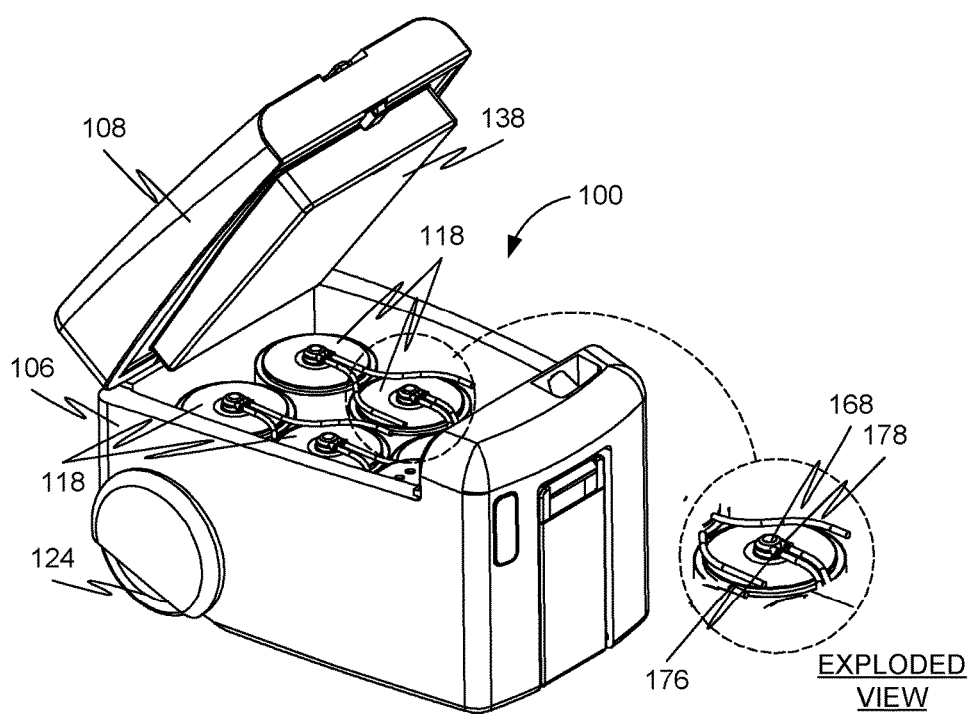
FIG. 12 shows a perspective view of the beverage dispensing cooler with cylinders, quick-connect caps, and tubes along with an exploded view of a cylinder, in accordance with some embodiments.
Figure 13:
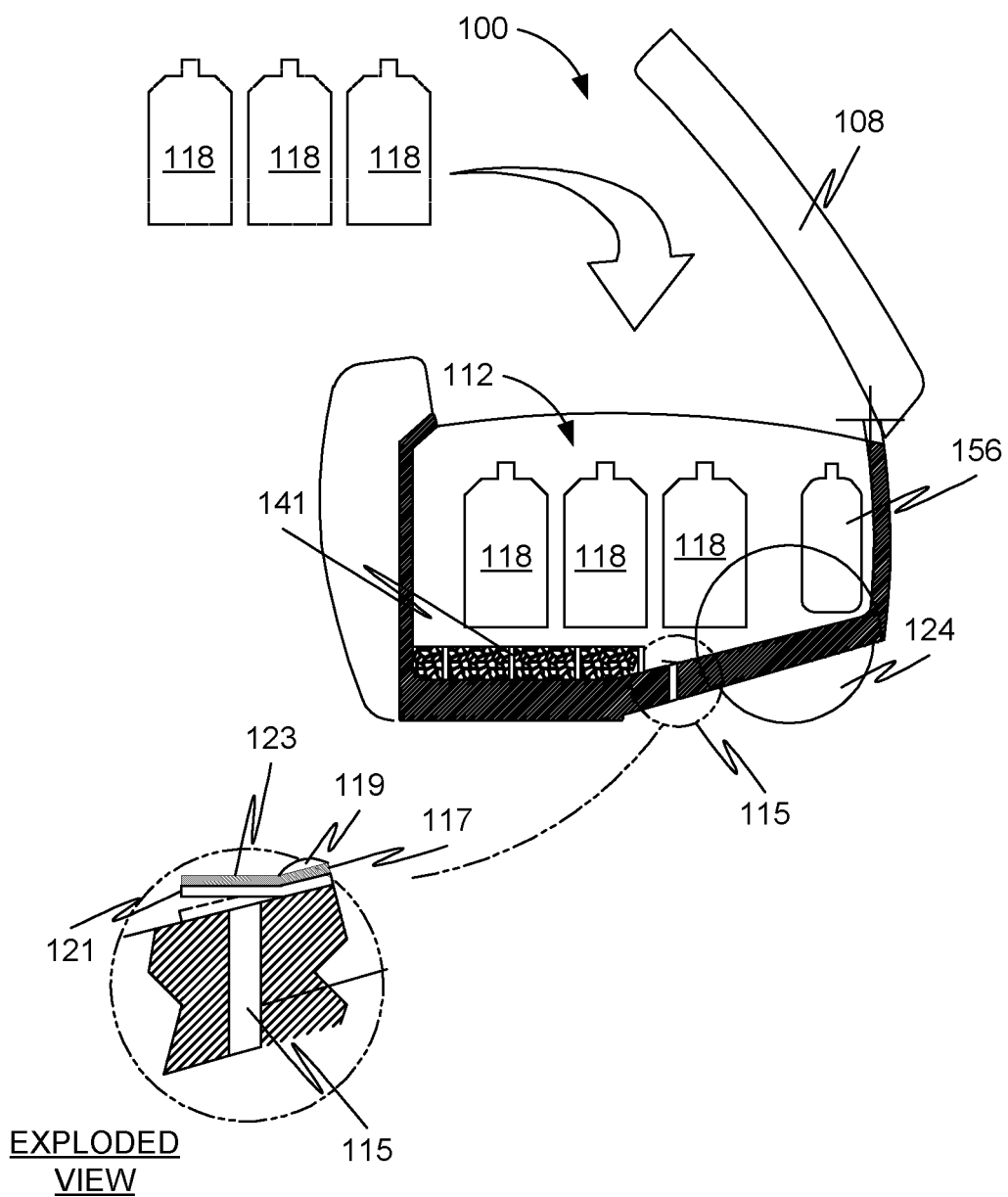
FIG. 13 is a side view of the beverage dispensing cooler with a wall drain, a base valve, and a basin along with an exploded view of the wall drain, in accordance with some embodiments.
Figure 14:
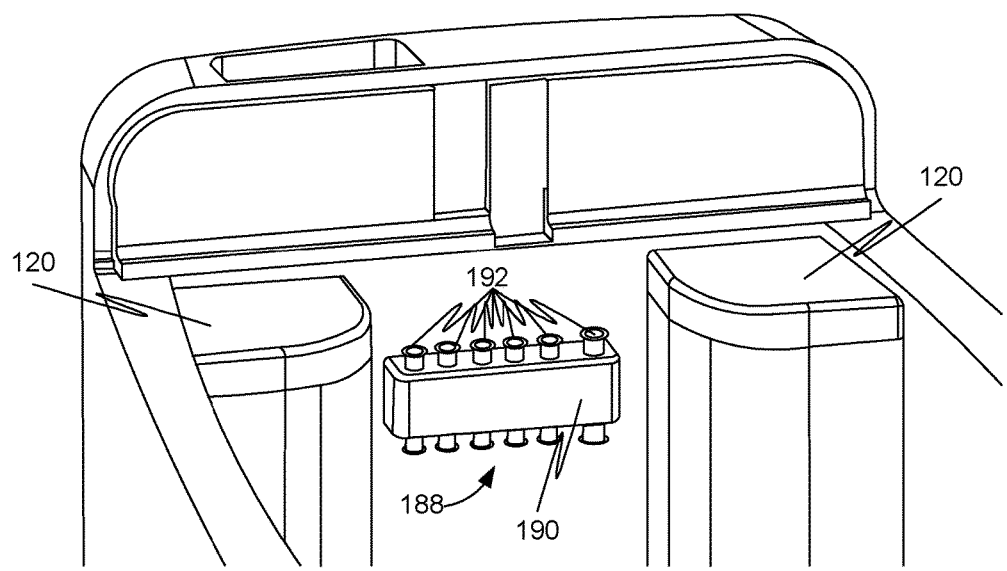
FIG. 14 is a perspective view of the beverage dispensing cooler and a flow control unit, in accordance with some embodiments.

FIG. 1 is a perspective view of a beverage dispensing cooler 100 with an extended handle 102 and a dispensing gun 104, in accordance with some embodiments. FIG. 2 is a perspective view of the beverage dispensing cooler 100 with the retracted handle 102 and the retracted dispensing gun 104, in accordance with some embodiments. The beverage dispensing cooler 100 comprises a body 106, a first lid 108, a second lid 110 (an ice lid), the handle 102, an axle (not shown), and a plurality of hoses. The body 106 generally forms the outside of the beverage dispensing cooler 100, and is made of any of a variety of sturdy, thermally-insulating materials that protects the contents from potential damage. The body 106 comprises a chamber 112, a power panel 113, a solar panel 114, a wall drain 115 (shown in FIG. 13), a primary hose 116 (shown in FIGS. 6, 21-23), a base valve 117 (shown in FIG. 13), a flow control unit 188 (shown in FIG. 14), a power unit (not shown), and the dispensing gun 104. The chamber 112 of the body 106 is generally the largest volume of the beverage dispensing cooler 100, providing a means for the user to store items to be chilled. The chamber 112 comprises a plurality of cylinders 118 (shown in FIG. 4, 12-13), a plurality of pressure compartments 120 (shown in FIG. 4, 14), and a basin 122 (shown in FIG. 4, 6). The basin 122 is the generally flat area beneath the plurality of cylinders 118 which collects water from condensation and melted ice, and which connects the wall drain 115 to the base valve 117. The wall drain 115 is an opening or a series of openings within the walls of the beverage dispensing cooler 100 that allow accumulated water to flow from the first lid 108 and second lid 110 into the basin 122. The base valve 117 is an opening with an adjustable closure that connects the basin 122 to outside of the beverage dispensing cooler 100. This arrangement allows a user to controllably empty the basin 122, so that when the beverage dispensing cooler 100 becomes weighed down with water from condensation or melted ice, the user can reduce the weight of the beverage dispensing cooler 100 by opening the base valve 117 and releasing the water that has accumulated in the basin 122. The base valve 117 may include a fastener 119, a flexible rubber drain flapper valve 121 (with specific gravity<100) and a rigid shield plate 123, as shown in FIG. 13.

Figure 7:
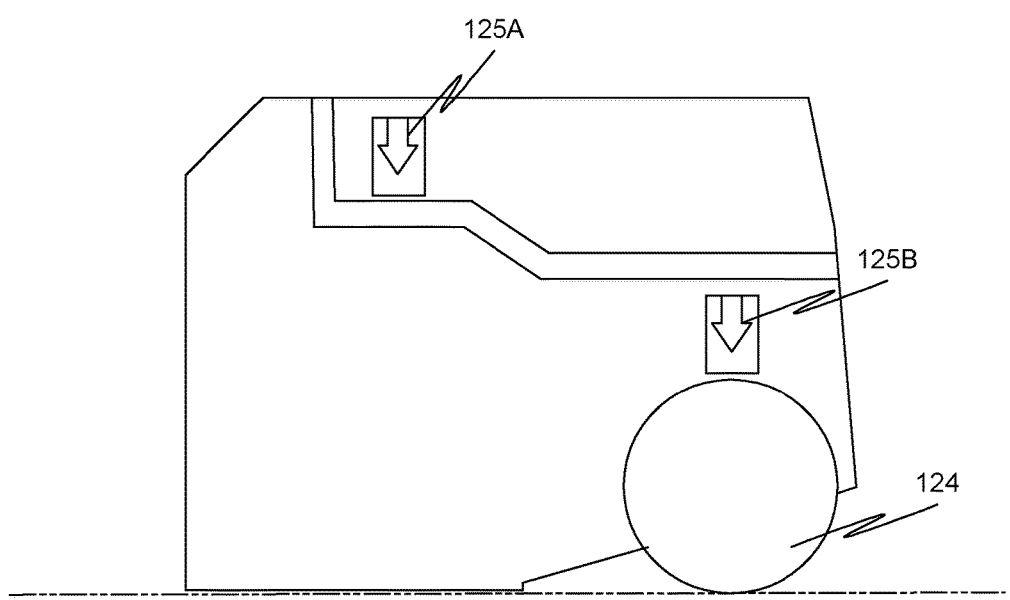
FIG. 7 is a side view of the beverage dispensing cooler, in accordance with some embodiments.

The axle extends generally through the body 106 of the beverage dispensing cooler 100, enabling easy transportation of the beverage dispensing cooler 100. The axle comprises a rod (not shown), a plurality of wheels 124, and a plurality of bearings. The rod runs through the width of the body 106 and connects the wheels of the plurality of wheels 124. The plurality of bearings is connected directly to the rod and to the plurality of wheels 124, allowing the wheels to turn smoothly and independently of each other. The plurality of wheels 124 is a set of cylindrical extrusions that rotate along the ground, minimizing contact area with the ground and thus allowing for facilitated transport of the beverage dispensing cooler 100. The plurality of wheels 124 comprises a button, a plurality of spike housings, and a plurality of spikes. The plurality of spikes is a set of generally conical extrusions that extend from inside the plurality of spike housings. The plurality of spike housings is a circular pattern of radial holes covering the surface of the plurality of wheels 124. The button activates the plurality of spikes, sending them out from the plurality of wheels 124, when pressed, and bringing the plurality of spikes back into the plurality of spike housings, when pressed again. In an alternative embodiment, the plurality of wheels 124 further comprises a plurality of grooves. The plurality of grooves is a set of cuts into the plurality of wheels 124 that increases the traction of the plurality of wheels 124 when the plurality of wheels 124 is in contact with rough or unsteady surfaces. This arrangement allows the user to utilize the axle to facilitate movement of the beverage dispensing cooler 100 over a wide variety of surfaces which may or may not be stable and even. As shown in FIG. 7, the beverage dispensing cooler 100 includes an integrated lock 125A that may be used to lock the beverage dispensing cooler 100 while transportation. Further, the beverage dispensing cooler 100 includes an integrated wheel lock 125B that may be used to lock the wheel 124 when there is a need to keep the beverage dispensing cooler 100 stable.

Figure 23:
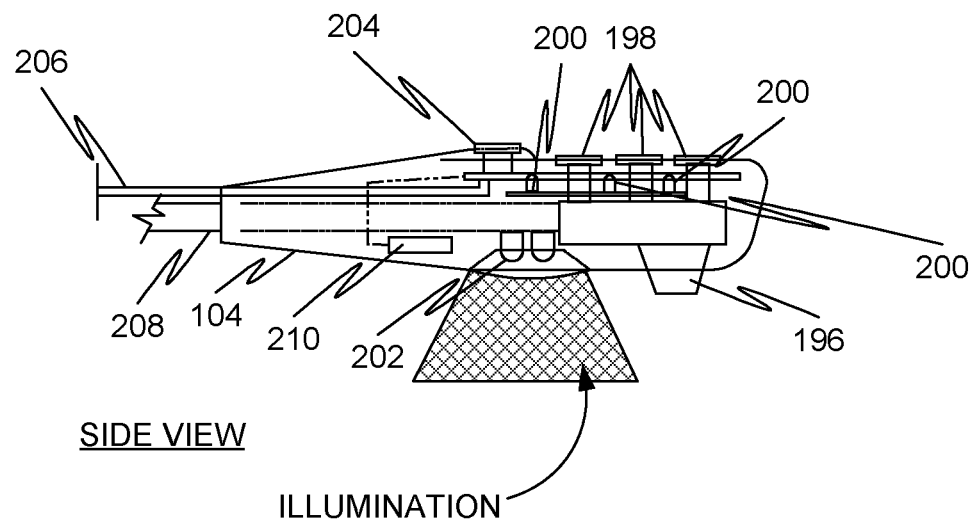
FIG. 23 shows a side view and a perspective view of the dispenser gun of the beverage dispensing cooler, in accordance with some embodiments.
Figure 23:
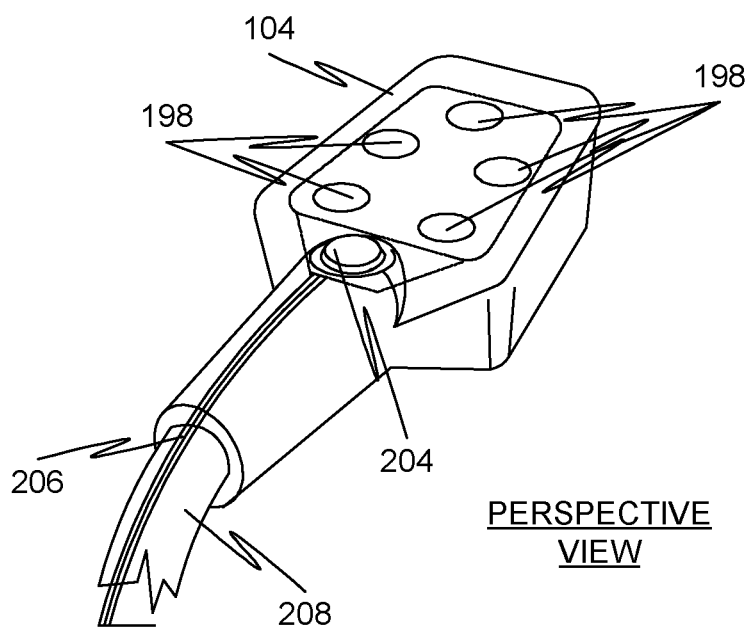

The handle 102 facilitates engagement of the beverage dispensing cooler 100 with the hand of a user, and enables a user to improve leverage on the beverage dispensing cooler 100 during transport via the axle. The handle 102 is located generally opposite the axle of the beverage dispensing cooler 100, and comprises a first segment 126 and a second segment 128. In an alternative embodiment, the handle 102 comprises a plurality of ancillary segments. The first segment 126 comprises a pair of hollow extrusions that connects to the body 106 and allows for adjustment of the angle of the handle 102 relative to the body 106. The first segment 126 further comprises a hinge and a plurality of holes. The hinge connects to the body 106 distal from the second segment 128 when the handle 102 is elongated, and allows for adjustment of the angle of the handle 102 relative to the body 106. The plurality of holes is a pattern of generally circular holes around each hollow extrusion of the pair of hollow extrusions, at various distances from the hinge. The second segment 128 telescopes out from the first segment 126, and comprises a dispenser mount 130, a grip 132, and a plurality of buttons. The dispenser mount 130 is a curved component attached near the grip 132 of the second segment 128 that allows for temporary holding of the dispensing gun 104 (as shown in FIG. 23). The dispenser mount 130 comprises a cover, which extends over the dispenser mount 130 to ensure the dispensing gun 104 is protected from adverse weather conditions, when it is stored on the dispenser mount 130. The grip 132 is a generally cylindrical, ergonomic component that provides an intuitive and comfortable means of utilizing the handle 102. The plurality of buttons corresponds with the plurality of holes of the first segment 126, and allows a user to adjust the height of the second segment 128 relative to the first segment 126, thus giving the handle 102 its telescoping ability. The plurality of buttons comprises a spring and a bump. The bump is the component which makes contact with the user's fingers in the preferred use of the handle 102, and the spring biases the bump out into the plurality of holes of the second segment 128. This arrangement allows a user to press the buttons of the plurality of buttons that are within the holes of the plurality of holes to allow the second segment 128 to move relative to the first segment 126, and allows the second segment 128 to snap into position relative to the first segment 126 as the plurality of buttons matches with the plurality of holes. This arrangement also allows for multiple possibilities for the length of the handle 102. The plurality of ancillary segments is a set of ancillary segments that allows for additional extension of the handle 102, by connecting to the first segment 126 and second segment 128.

Figure 4:
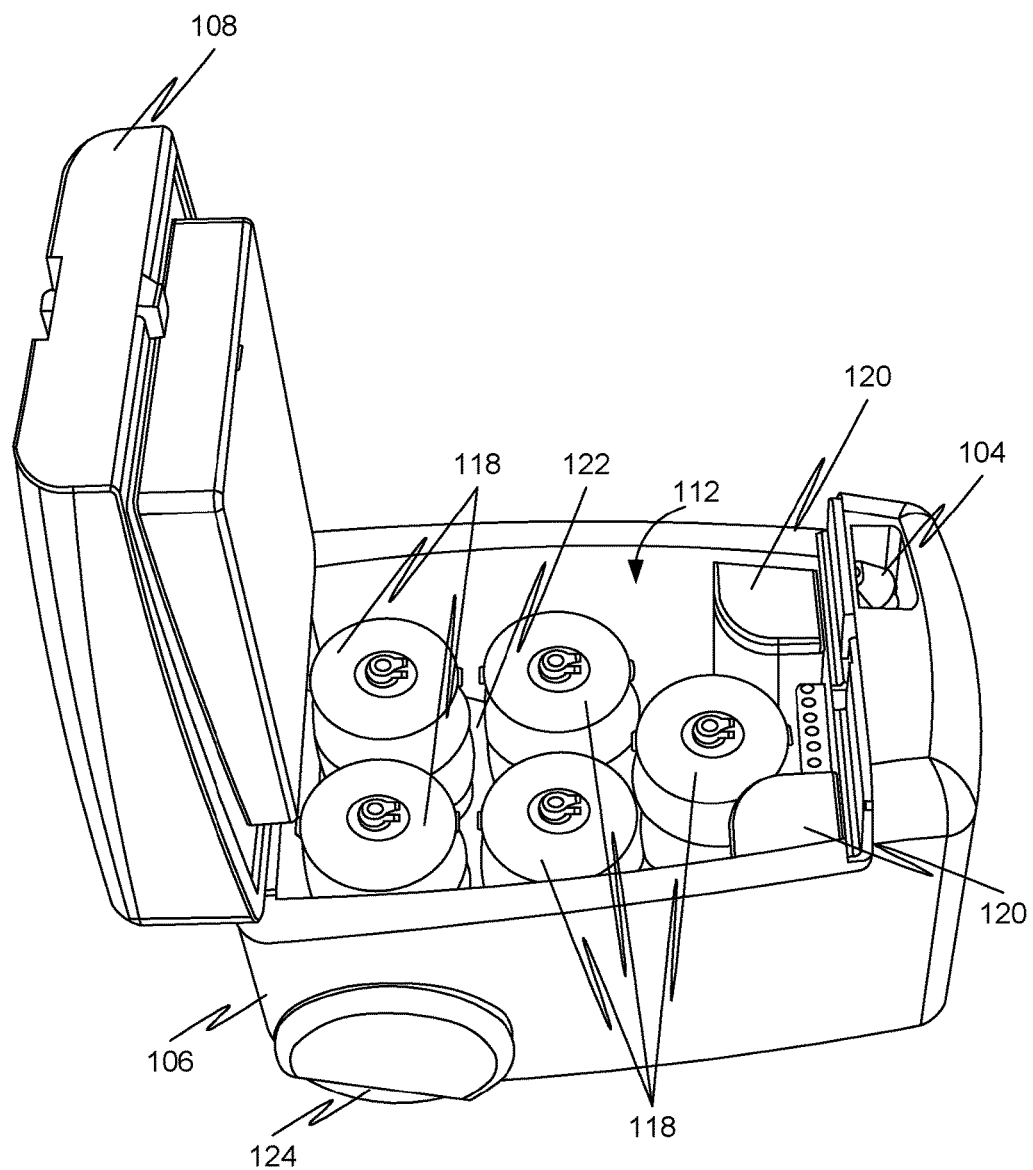
FIG. 4 is a top perspective view of the beverage dispensing cooler with a first lid in open position, in accordance with some embodiments.
Figure 9:
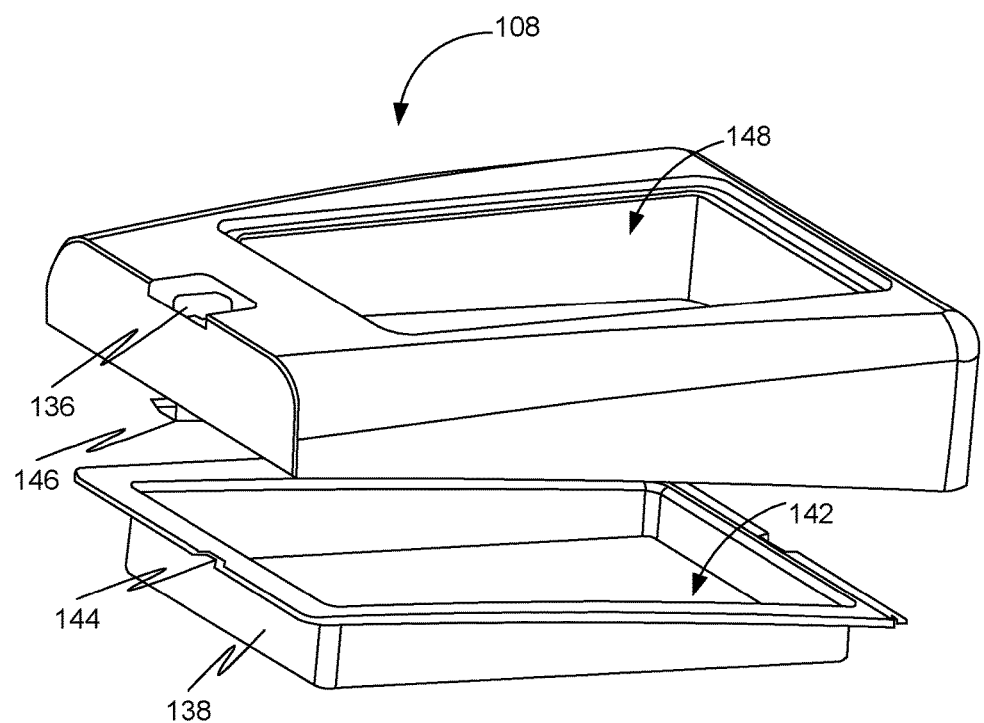
FIG. 9 is a perspective view of the first lid and a tray of the beverage dispensing cooler, in accordance with some embodiments.
Figure 10:
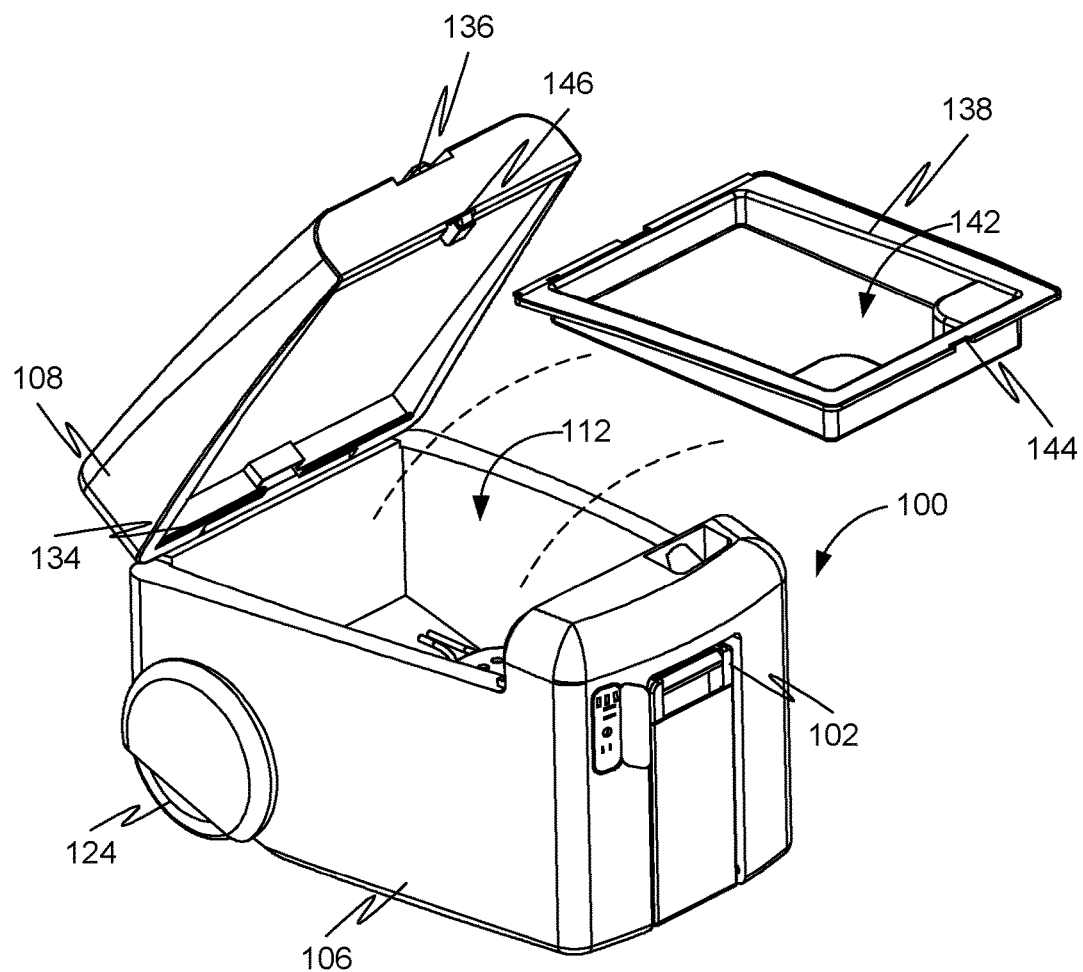
FIG. 10 is a perspective view of the beverage dispensing cooler with the first lid open and the tray removed from the beverage dispensing cooler, in accordance with some embodiments.
Figure 11:
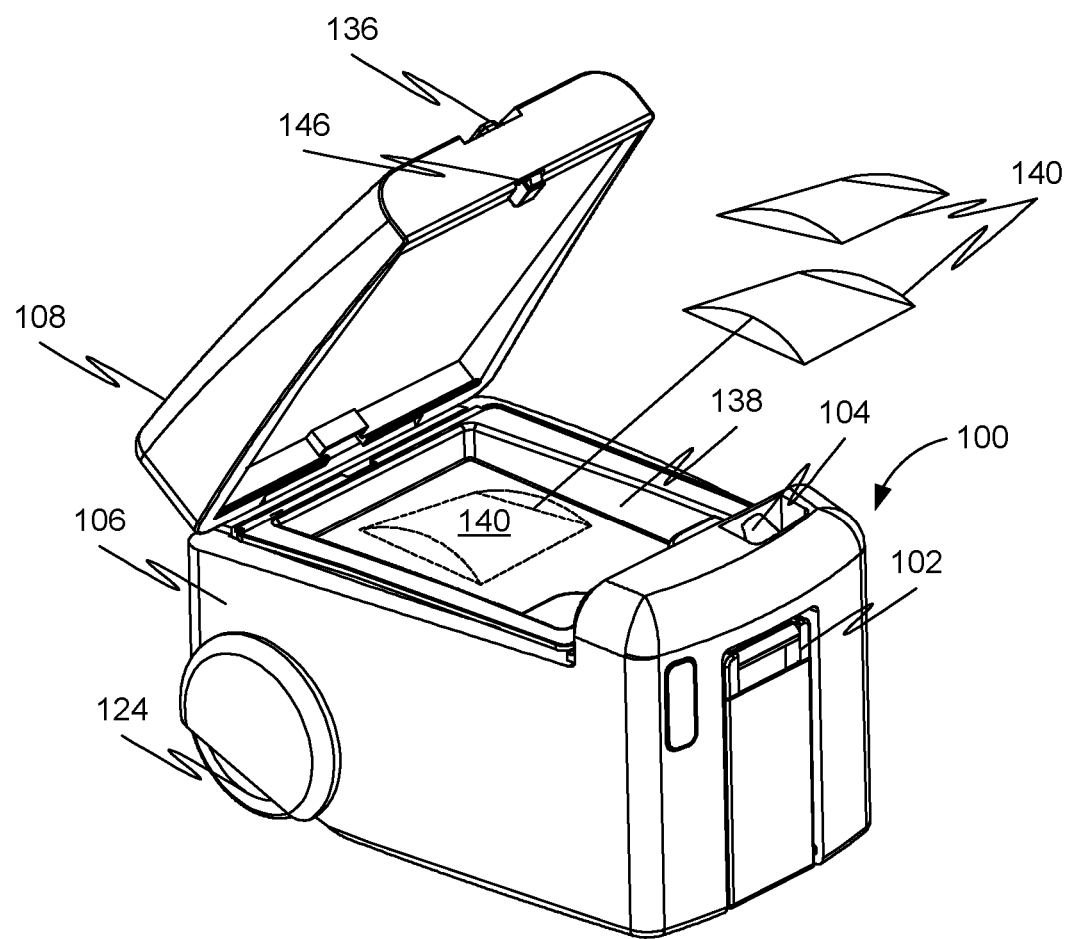
FIG. 11 is a perspective view of the beverage dispensing cooler with the first lid in open position, in accordance with some embodiments.

The first lid 108 allows for access to the chamber 112 when the first lid 108 is in the open position (as shown in FIG. 4), and fits securely over the chamber 112 to allow for insulation of the contained ice, beverages, and other materials within the chamber 112, when the first lid 108 is in the closed position. The first lid 108 comprises a plurality of hinges 134, a switch 136, and a plurality of trays 138, as shown in FIG. 9-11. The plurality of hinges 134 connect to the body 106, allowing the first lid 108 to hinge open and closed in a fashion similar to the operation of a clam's shell. The plurality of trays 138 is a set of containers of different depths and effective storage volumes which fit atop the chamber 112 and beneath the chamber-facing side of the first lid 108 to allow for storage of food items. The plurality of trays 138 may be removed and switched at the will of the user, to customize the volume of the chamber 112 and the volume of the plurality of trays 138. Such an arrangement is particularly advantageous to the user who desires to transport snacks 140 along with beverages in the beverage dispensing cooler 100, because by placing the snacks 140 within the plurality of trays 138, the user can effectively keep the snack items 140 at a low temperature without exposing them to the wetness of the ice in the chamber 112. The plurality of trays 138 comprises a containment area 142, a notch 144, and in some embodiments a freeze gel lining. The freeze gel lining is a material within the plurality of trays 138 that cools as a result of exposure to ice or low temperatures within the chamber 112, thus ensuring the tray containment area 142 remains cool or cold. The notch 144 is a generally rectangular cut into the plurality of trays 138 that allows for interaction of the plurality of trays 138 with the switch 136. The switch 136 is used to allow a user to choose to open the first lid 108 to reveal either the plurality of trays 138 or the chamber 112. The switch 136 comprises a slide, a latch 146, and a channel. The slide is the component of the switch 136 that a user interacts with to activate the switch 136. The channel is a cut into the body 106 which serves as a guide for the slide. The channel comprises a first end and a second end, which are opposite each other and which signify the physical range of the channel. The slide connects to the latch 146 to form one continuous unit. The latch 146 is a generally thin, rectangular extrusion. This arrangement allows for the slide to move from the first end of the channel to the second end of the channel. When the slide is at the first end, the latch 146 extends generally under the notch 144 of the plurality of trays 138, allowing the first lid 108 to open and reveal the containment area 142 of the relevant tray of the plurality of trays 138. When the slide is at the second end, the latch 146 extends under the plurality of trays 138 next to the notch 144, allowing the first lid 108 to open to reveal the chamber 112.

Figure 8:
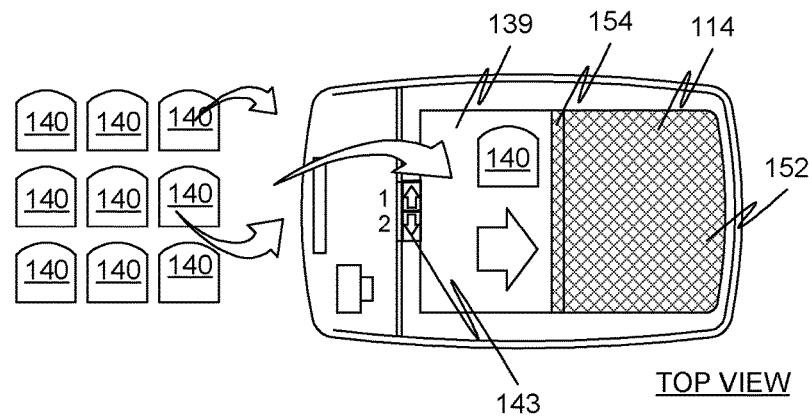
FIG. 8 is shows a top view, a front view, a side view of the beverage dispensing cooler and a latch, in accordance with some embodiments.
Figure 8:
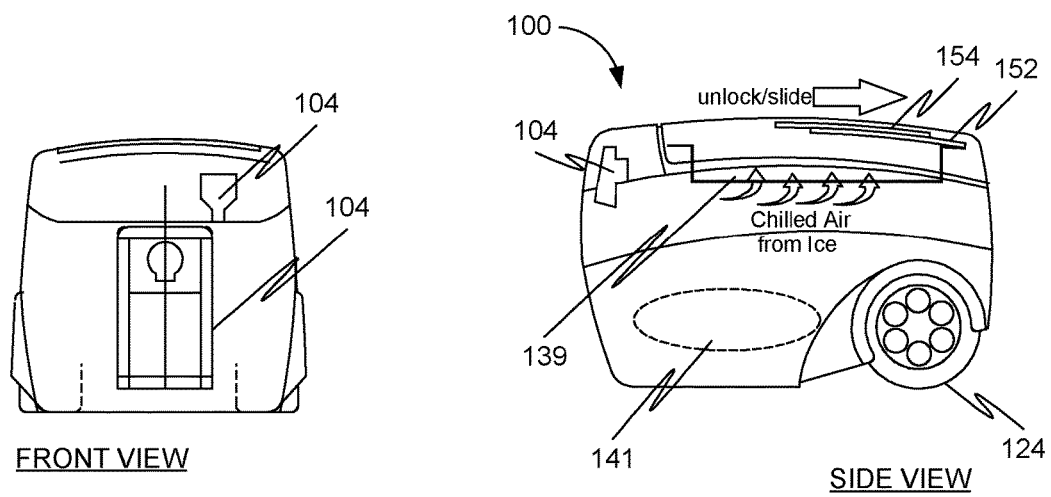

As shown in FIG. 8, the plurality of trays 138 may include a tray 139 to store snacks 140. The tray 139 includes vented openings to allow the chilled air to enter the tray 139. The ice may further be stored in ice baffles 141. Further, the beverage dispensing cooler 100 may include a dual slide latch 143, wherein if the dual slide latch 143 is slid in a first direction, then beverage is accessible and if the latch is slid in a second direction, then food storage is accessible.

The second lid 110 is positioned generally atop the first lid 108. The second lid 110 is the cover of a space inside the first lid 108, which, in the preferred usage, stores ice conveniently for addition to dispensed drinks. The second lid 110 comprises a container 148, a track, a plurality of solar panels 114, and a plurality of electrical connections. The container 148 is the space carved into the first lid 108 that allows for containment of items such as ice 150. The container 148 comprises an opening and a freeze gel lining. The opening connects the open volume of the container 148 to the wall drain 115, allowing built-up water due to melting ice or condensation to drain into the basin 122. The freeze gel lining is embedded within the walls of the container 148, and helps maintain a cool temperature within the container 148. Ice placed within the container 148 will cool the freeze gel lining. In this way, the container 148 may also assist in cooling the containment area 142 of the plurality of trays 138 of the first lid 108. The plurality of solar panels 114 is a series of solar panels which supply solar energy to the battery of the power unit. This system is advantageous for a user who does not have access to external power sources or batteries for extended periods of time. The plurality of solar panels 114 comprises a primary solar panel 152 and at least one ancillary solar panel 154. The primary solar panel 152 is secured into position above the container 148 by a variety of permanent means known in the art, and covers half of the otherwise exposed container 148. The at least one ancillary solar panel 154 attaches to the track. The track extends across the top of the container 148, just beneath the primary solar panel 152. This arrangement allows the at least one ancillary solar panel 154 to slide under the primary solar panel 152 along the track to allow access to the container 148. The at least one ancillary solar panel 154 slides generally away from the primary solar panel 152 to close and cover the container 148. The plurality of solar panels 114 connects to the power unit via the plurality of electrical connections of the second lid 110, thereby allowing the plurality of solar panels 114 to charge the battery within the battery container 148.

The plurality of pressure compartments 120 of the chamber 112 is a set of areas within the chamber 112 that each comprise a wall, a lid, and a gas pressure tank 156 (shown in FIG. 13). The wall and lid protect the gas pressure tank 156 from the ice or other contents of the chamber 112 during the preferred use of the beverage dispensing cooler 100. The wall comprises a hole, which allows access to the gas pressure tank 156 via the plurality of hoses. The lid of the plurality of pressure compartments 120 comprises a sealed edge, which is a flexible, rubbery ring, shaped component that seals the lid securely and removably to the plurality of pressure compartments 120. The gas pressure tank 156 comprises an adapter. The adapter allows for separation of the pressure into the different cylinders of the plurality of cylinders 118. The adapter comprises a plurality of hose connectors and a valve. The plurality of hose connectors allows for connection of the plurality of hoses to the adapter, and thus allows access to the gas within the gas pressure tank 156. The valve is a generally cylindrical manual control which a user can rotate to control the pressure released from the gas pressure tank 156. In the preferred usage of the beverage dispensing cooler 100, gas pressure comes from the gas pressure tank 156 of only one pressure compartment of the plurality of pressure compartments 120, and the other pressure compartments are used primarily for storage. However, in alternative embodiments, several or all pressure compartments of the plurality of pressure compartments 120 are used in conjunction with each other to provide adequate pressure to the plurality of cylinders 118.

Figure 15:
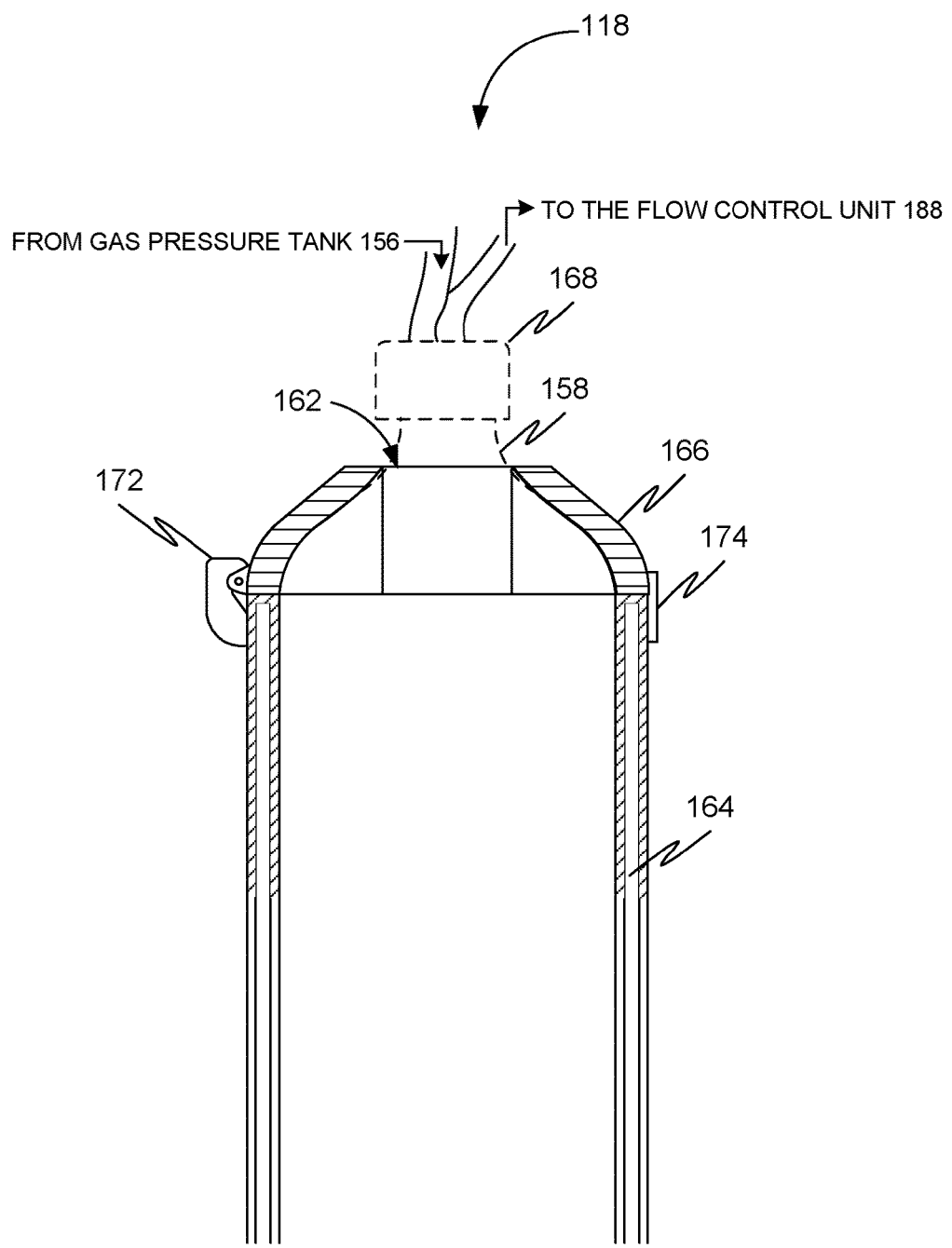
FIG. 15 is a sectional view of a cylinder of the beverage dispensing cooler, in accordance with some embodiments.
Figure 16:
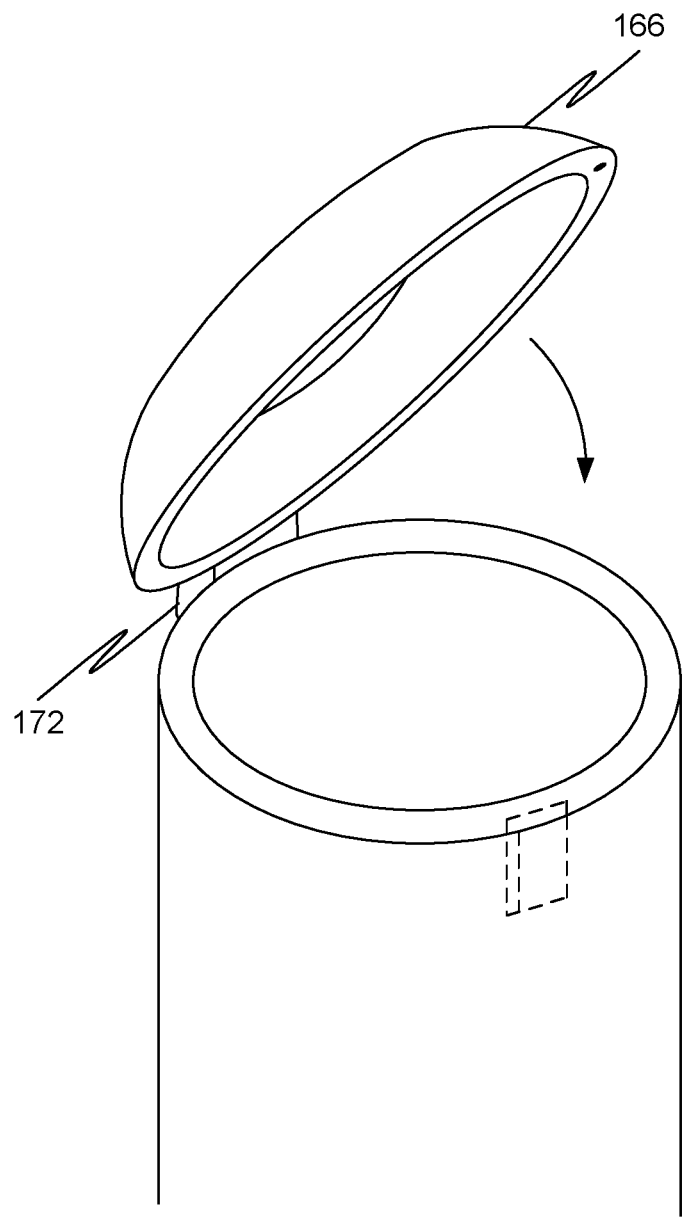
FIG. 16 is a perspective view of a cylinder and a cylinder lid of the beverage dispensing cooler, in accordance with some embodiments.
Figure 17:
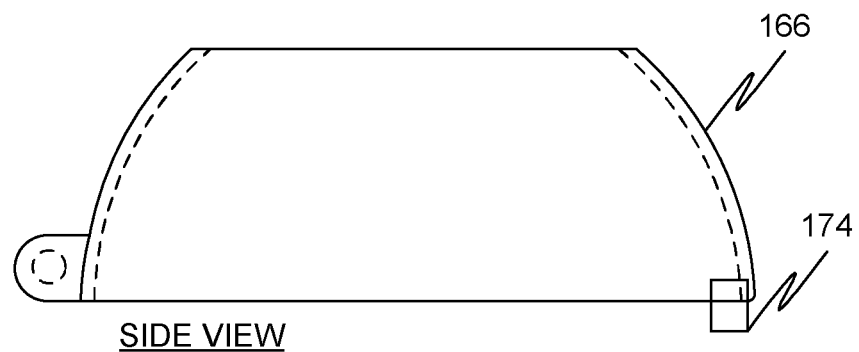
FIG. 17 shows a side view and a top of the cylinder lid of the beverage dispensing cooler, in accordance with some embodiments.
Figure 17:
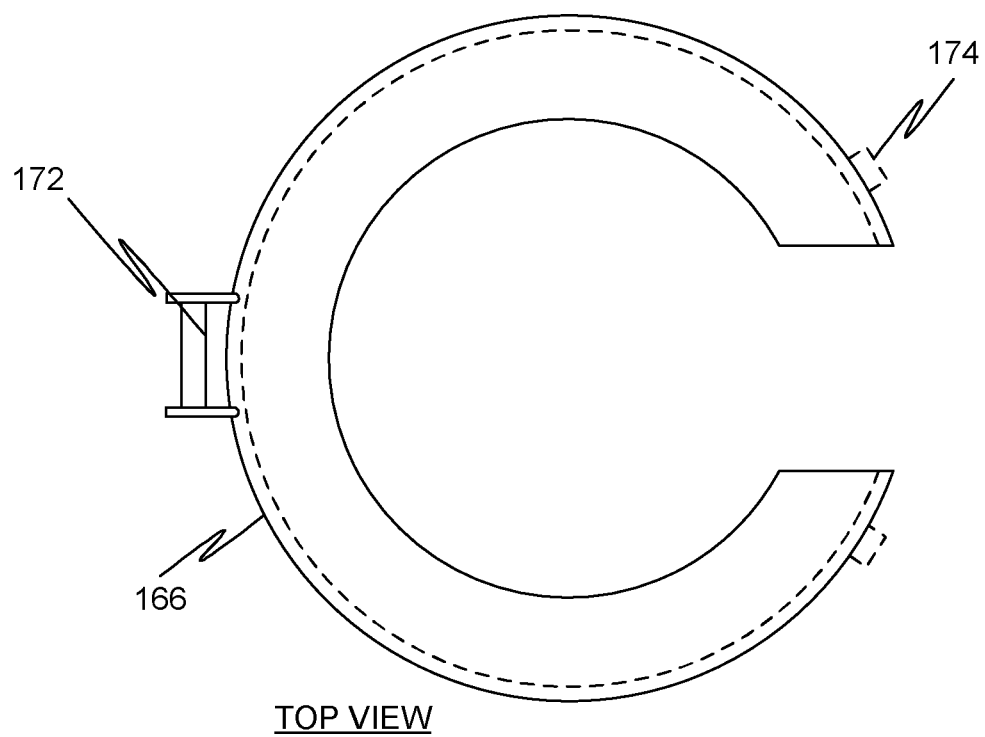

The plurality of cylinders 118 is a set of hollow cylinders designed to snugly contain and orient one two-liter bottle of soda 158 each, as shown in FIG. 15-16. In the preferred embodiment, the plurality of cylinders 118 is directly and permanently connected to the chamber 112. This ensures that a bottle 158 or keg 160 placed within a cylinder of the plurality of cylinders 118 is always in the proper orientation with respect to the body 106 for dispensing. In an alternative embodiment, the plurality of cylinders 118 is attached to the chamber 112 by means of fasteners, connectors, snaps, or other removable means generally known in the art. Such an arrangement may be desirable for a user who wishes to adjust or change the number of cylinders 118 within the chamber 112. In an alternative embodiment, the plurality of cylinders 118 may snugly contain and orient a five-liter keg of beer. The plurality of cylinders 118 comprises an opening 162, a freeze gel lining 164, a lid 166, a quick-connect cap 168, and a keg adapter 170. The opening 162 extends generally toward the first lid 108, enabling a user to insert a bottle 158 into a cylinder of the plurality of cylinders 118. The freeze gel lining 164 is embedded within walls of the plurality of cylinders 118, such that it is not physically exposed on either side. The plurality of cylinders 118 is made of any rigid, thermally conducting material, thus allowing the temperature of the freeze gel lining 164 to drop as a result of ice surrounding the plurality of cylinders 118. This arrangement allows the contents of the plurality of cylinders 118 to be exposed to low temperatures, while simultaneously ensuring that the contents are not exposed to water or moisture due to the ice melting. The lid 166 of the plurality of cylinders 118, as shown in FIG. 15-17, is shaped to accommodate and protect the contents of the plurality of cylinders 118, and to orient the cap 168 properly with respect to the plurality of cylinders 118. The lid 166 comprises a hinge 172 and a latch 174. The hinge 712 allows the lid 166 to swing open for insertion of a five-liter bottle 158 or a two-liter keg 160, and the latch 174 connects to the plurality of cylinders 118 opposite the hinge 172 to secure the lid 166 in the closed position.

Figure 18:
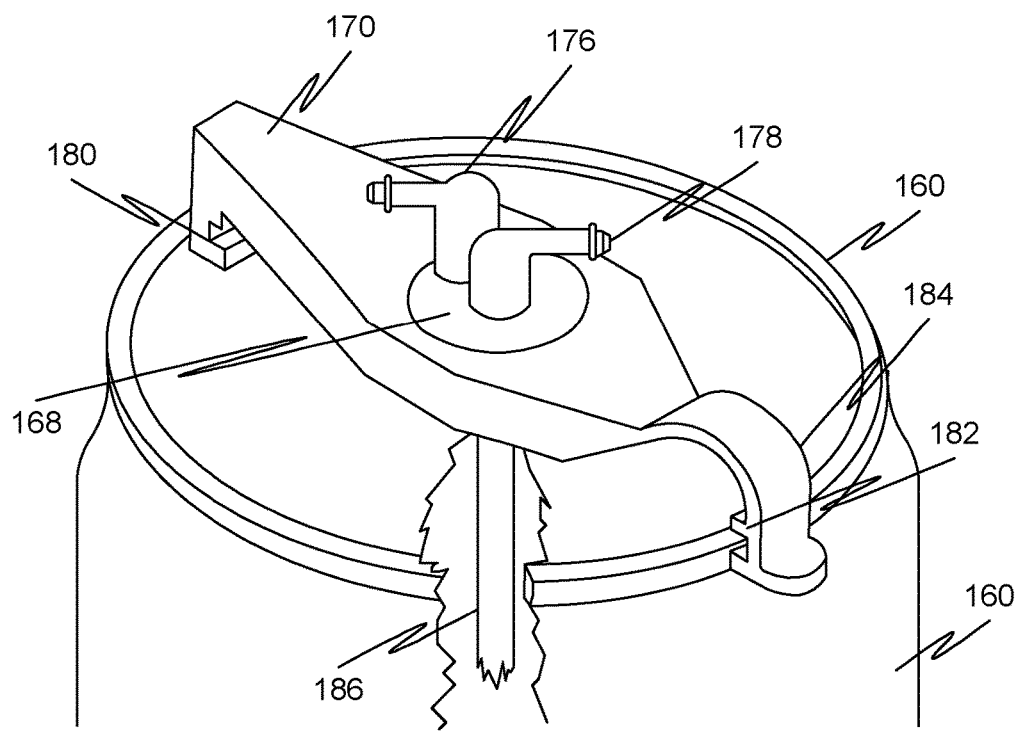
FIG. 18 is a perspective view of a keg adapter of the beverage dispensing cooler, in accordance with some embodiments.
Figure 19:
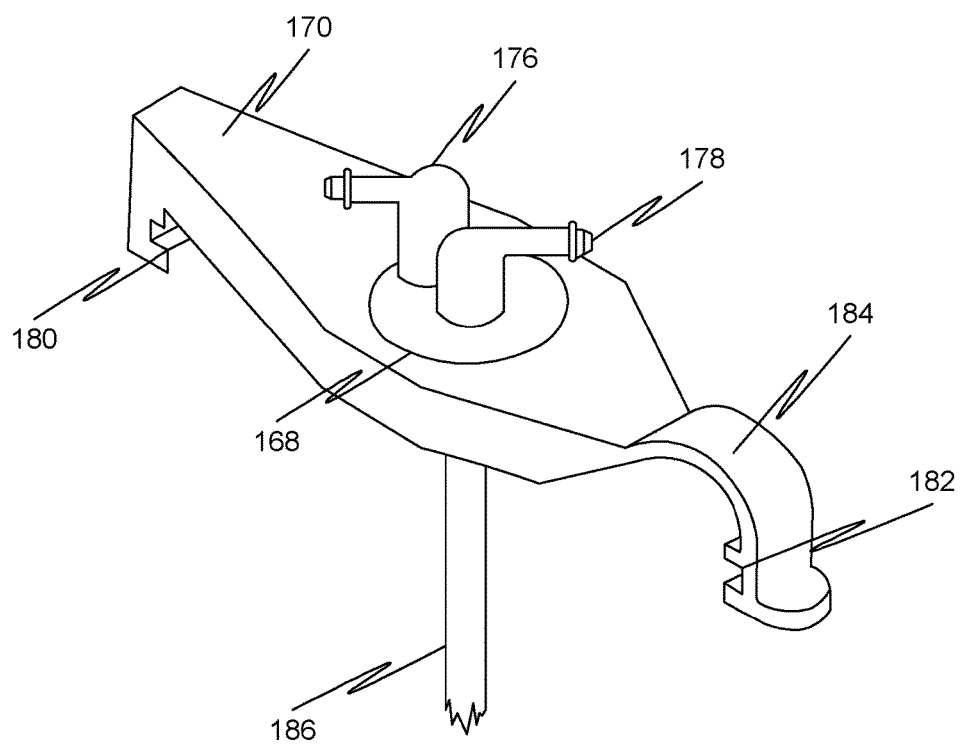
FIG. 19 is a perspective view of the keg adapter of the beverage dispensing cooler, in accordance with some embodiments.
Figure 20A:
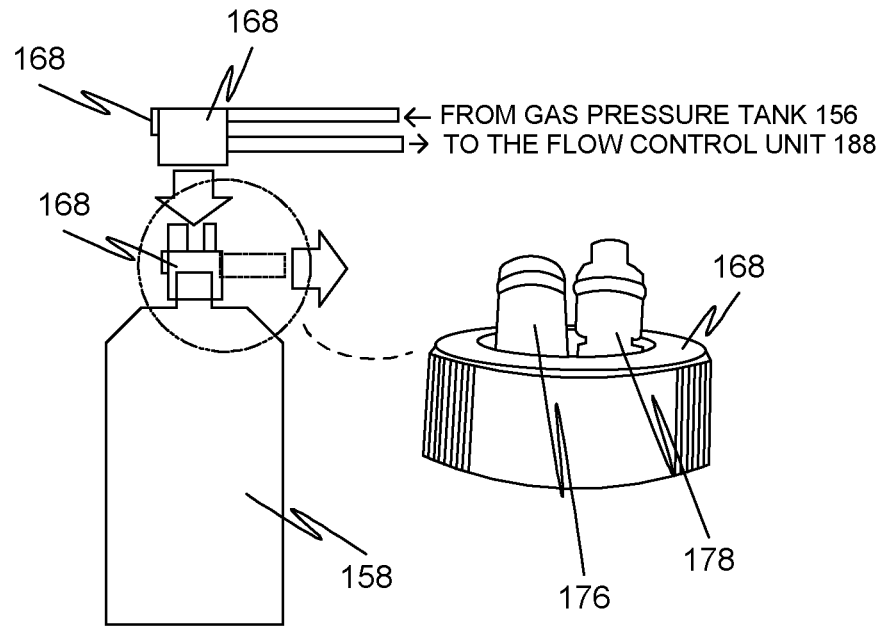
FIG. 20A is a side view of the cylinder with a bottle and the quick-connect cap of the beverage dispensing cooler in accordance with some embodiments.
Figure 20B:
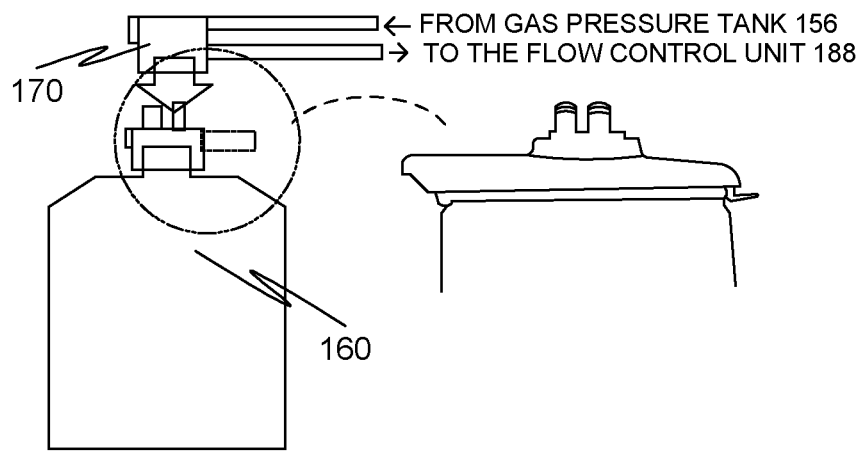
FIG. 20B is a side view of the cylinder with a keg and the quick-connect cap of the beverage dispensing cooler in accordance with some embodiments.

The quick-connect cap 168, as shown in FIGS. 15, 20A, is an attachment that connects the bottle 158 inserted into the plurality of cylinders 118 to the plurality of hoses. The quick-connect cap 168 comprises an input nozzle 176, an output nozzle 178, a tube 186, a button, and a threaded exterior. The input nozzle 176 is a hollow extrusion that allows for connection of the quick-connect cap 168 to the gas pressure tank 156 of the plurality of pressure compartments 120. This arrangement allows gas (such as carbon dioxide gas) to flow from the gas pressure tank 156 directly into the bottle 158 placed within the plurality of containers 118, where the gas can maintain the carbonated state of the contained beverage via increased pressure and gas exposure. In an alternative embodiment, the input nozzle 176 comprises a ball valve, which can be adjusted by the user to control the amount of pressure and gas being applied to the plurality of cylinders 118. The output nozzle 178 is a hollow extrusion that allows for connection of the quick-connect cap 168 to the flow control unit 188 via the plurality of hoses. The button is a component which extends generally below the quick-connect cap 168, allowing the quick-connect cap 168 to snap onto a bottle 158 or opening 162 and release from the opening 162 easily. The button comprises a body, a spring, a hinge, and a ridge. The ridge, hinge, and body are one continuous object. The spring is positioned within the button behind the body, biasing the button away from the geometrical midpoint of the quick-connect cap 168. When the button is pressed, the body pivots about the hinge, and the ridge moves generally away from the ridge of the bottle 158 within the plurality of cylinders 118. The ridge extends perpendicularly from the body of the button, and tapers towards the opening of a bottle in the preferred usage of the beverage dispensing cooler. This arrangement allows for the user to press the quick-connect cap 168 over an open bottle of soda 158 and snap to the outside of the bottle 158 once the ridge has passed over it. The tube extends into the bottle of soda 158 or the keg 160, allowing the liquid within to connect to the input nozzle 176 and the output nozzle 178. In the embodiment in which the plurality of cylinders 118 is adapted for kegs (shown in FIGS. 18, 19, 20B), the threaded exterior of the quick-connect cap 168 allows for connection of the quick-connect cap 168 to the keg adapter 170. The keg adapter 170 comprises a first end, a second end, and a threaded hole. The threaded hole of the keg adapter 170 matches with the threading of the threaded exterior of the quick-connect cap 168, allowing a user to secure the quick-connect cap 168 into place by applying appropriate torque to the quick-connect cap 168. A first end of the keg adapter 170 extends from the threaded hole radially outward. The first end comprises a lip 180, which wraps around the edge of the keg 160 to connect. The second end of the keg adapter 170 extends from the threaded hole radially outward, opposite the first end. The second end comprises a lip 182 and a curve 184. The lip 182 allows for connection of the second end to the edge of the keg 160, and the curve 184 allows for a slight bend in the keg adapter 170. This arrangement allows a user to press the keg adapter 170 securely into position atop the keg 160, simultaneously securing the quick-connect cap 168 in place. The user taps the keg 170 and inserts tube 186 of the quick-connect cap 168 inside, then secures the quick-connect cap 168 in place atop the keg 160 using the first end and the second end of the keg adapter 170.

The flow control unit 188 allows a user to control the liquid being dispensed from the plurality of cylinders 118 through the dispensing gun 104 and into a user's cup. The flow control unit 188, shown in FIG. 14, comprises a body 190, a plurality of inlets 192, an outlet, a controller, and a plurality of electrical connections. The body 190 is preferably a generally rectangular prism shape, connected inside the chamber 112 near the first lid 108. And the dispensing gun 104. The plurality of inlets 192 is a series of hollow cylindrical extrusions extending from the body 190 of the flow control unit 188. The plurality of inlets 192 comprises a lip and a plurality of actuators. The lip is a ring-shaped extrusion concentric with each inlet of the plurality of inlets that allows for attachment of a hose of the plurality of hoses. The plurality of actuators is a series of actuators that open and close in response to receipt of an appropriate signal from the controller. The plurality of electrical connections joins the dispensing gun 104, the controller, the power unit, and the plurality of actuators. The outlet is a hollow cylindrical extrusion, preferably of slightly larger diameter than an inlet of the plurality of inlets, that comprises a lip. The lip is a ring-shaped extrusion concentric with the outlet that allows for attachment of the primary hose 116. The controller receives power from the power unit through the plurality of electrical connections, and distributes that power appropriately to the different components of the beverage dispensing cooler 100. This arrangement allows the controller to receive signals from the dispensing gun 104 through the plurality of electrical connections and convert these input signals into an output signal that determines which actuator of the plurality of actuators opens. In this way, when an actuator of the plurality of actuators is open, pressure from the gas pressure tank 156 of the plurality of pressure compartments 120 flows into the plurality of cylinders 118 through the input nozzle 176 of the quick-connect cap 168, causing liquid to flow out of the output nozzle 178 and into the flow control unit 188 through the appropriate inlet of the plurality of inlets 192, into the outlet, into the primary hose 116, and finally through the dispensing gun 104 and into a cup, glass, or similar container.

The power unit is an area within the body 106 which collects, contains, and distributes electrical energy as needed throughout the beverage dispensing cooler 100. The power unit comprises a battery container and at least one battery. The battery container allows for connection of the at least one battery to the controller and to the second lid 110. The at least one battery may be any of a variety of batteries capable of storing charge for an extended period of time. In an alternative embodiment, the at least battery is not rechargeable, but may be replaced with other similar disposable batteries. A battery of the at least one battery may be connected in series or in parallel to another battery of the at least one battery. Further, the at least one battery may contain both disposable and rechargeable batteries. In an alternative embodiment, the power unit further comprises a charge controller. The charge controller connects between the second lid 110 and the battery container. The charge controller ensures the constant flow of appropriate electrical energy comes from the second lid 110 to the at least one battery within the battery container.

Figure 5:
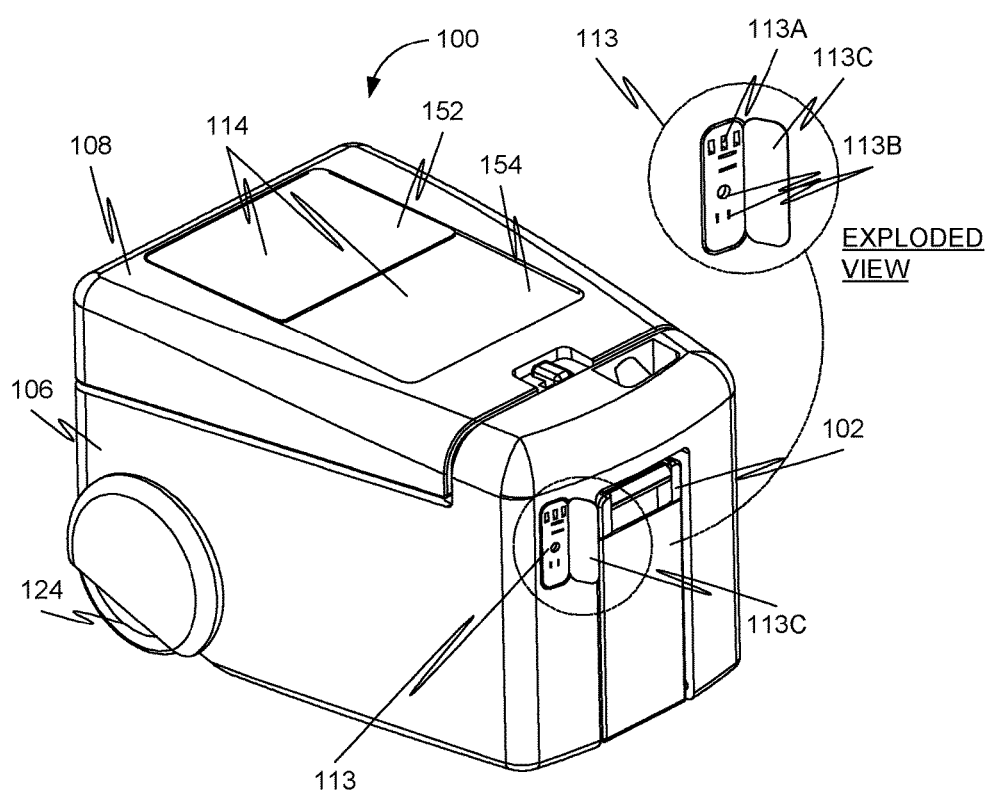
FIG. 5 shows a perspective view of the beverage dispensing cooler with a power panel open along with an exploded perspective view of the power panel, in accordance with some embodiments.

The power panel 113, shown in FIG. 5, allows a user to charge a variety of electrical devices from the beverage dispensing cooler 100. The power panel 113 connects to the power unit to provide the electrical energy necessary for charging. The power panel 113 comprises a plurality of USB ports 113A, a plurality of outlets 113B, a door 113C. In an alternative embodiment, a plurality of ancillary charging ports is also included. The door 113C swings open and closed to protect the plurality of USB ports 113A, the plurality of outlets 113B, and the plurality of ancillary charging ports when they are not in use. The plurality of USB ports 113A is a series of USB connectors that regulate charge from the power unit and allow a user to insert a male USB-style charging plug into the power panel 113. In similar fashion, the plurality of outlets 113B is a series of electrical outlets that regulate charge from the power unit and allow a user to insert a male electrical wall plug into the power panel 113. The plurality of ancillary charging ports encompasses alternative female charging ports that may be necessary for a user to charge electrical devices. The plurality of ancillary charging ports includes, among other ports, laptop power receivers, foreign power charging ports, and more.

Figure 21:
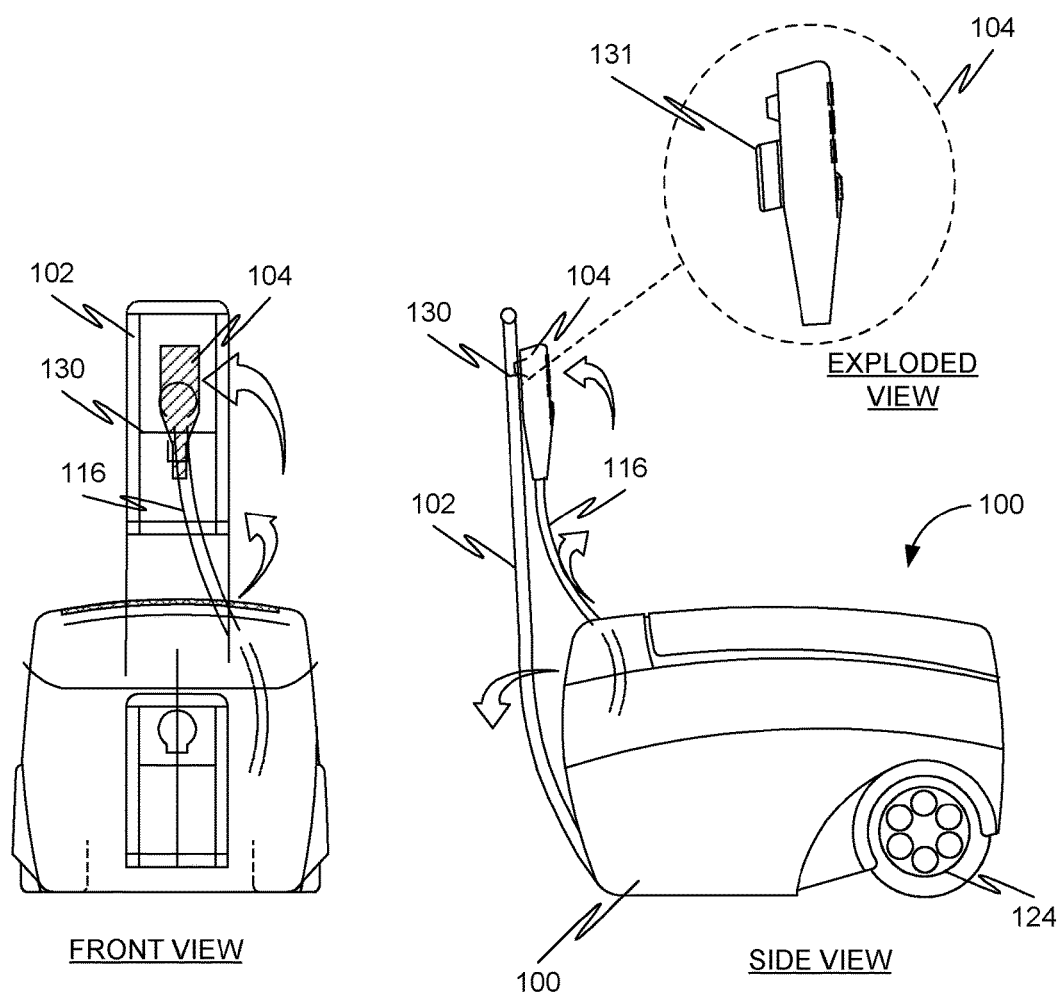
FIG. 21 shows a side view and a front view of the beverage dispensing cooler with extended dispenser gun along with an exploded side view of the dispenser gun, in accordance with some embodiments.
Figure 22:
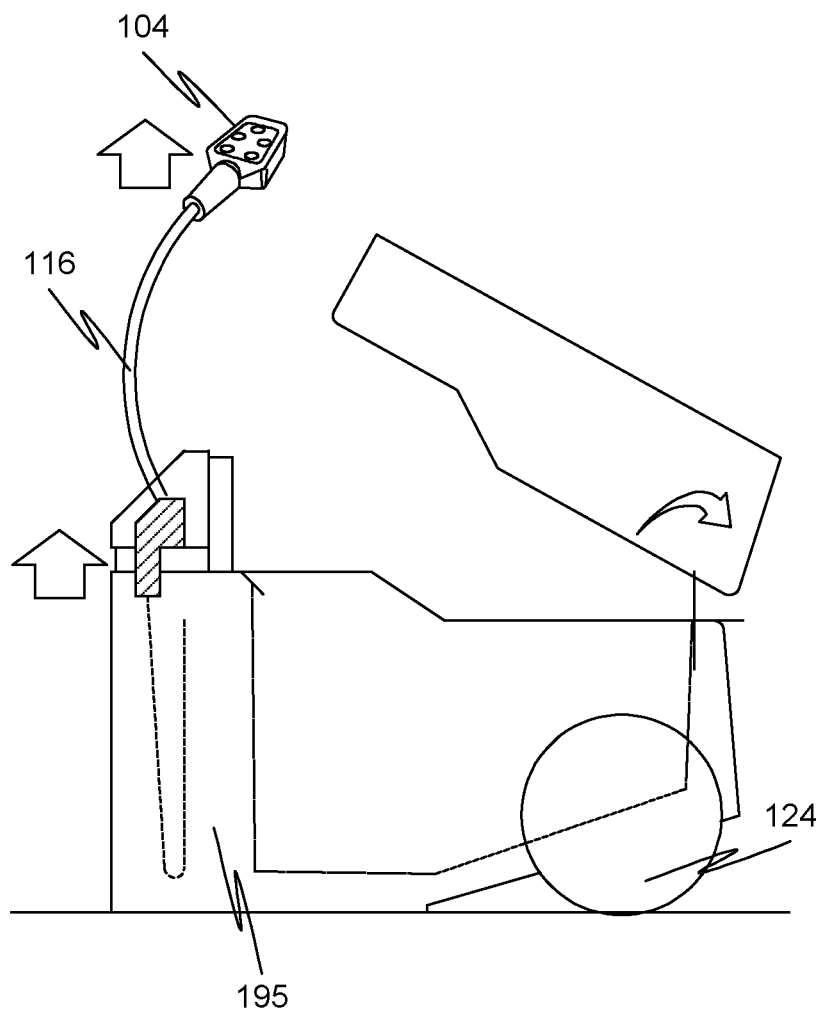
FIG. 22 is a side view of the beverage dispensing cooler with extended dispenser gun, in accordance with some embodiments.

The primary hose 116 is the strength-reinforced hollow cylinder which connects the dispensing gun 104 to the outlet of the flow control unit 188, as shown in FIGS. 21-22. The primary hose 116 comprises a first end, a second end, and a spool. The first end of the primary hose 116 connects to the outlet of the flow control unit 188 over the lip of the outlet. The second end 194 of the primary hose 116 connects to the dispensing gun 104. In an exemplary embodiment, several electrical connections of the plurality of electrical connections join the controller to the dispensing gun 104 by travelling through the primary hose 116. In an alternative embodiment, the plurality of electrical connections connects the controller to the dispensing gun 104 by wrapping around the primary hose 116. The spool is located within a hose storage compartment 195 in the body 106, and allows the primary hose 116 to wind around itself for storage. The spool comprises a constant-force spring and an extrusion. The extrusion is a cylinder that extends across the width of the spool and allows for the primary hose 116 and the constant-force spring to wind up. The constant-force spring attaches to a length of the primary hose 116, creating a constant force on the primary hose 116 that biases the dispensing gun 104 generally towards the spool. This ensures that when released, the dispensing gun 104 retracts back toward the beverage dispensing cooler 100, facilitating storage of the beverage dispensing cooler 100, and effectively preventing the user from losing or otherwise misplacing the dispensing gun 104.

The dispensing gun 104 is an ergonomically shaped hand grip component that allows a user to choose a liquid stored within the plurality of cylinders 118 and control the direction and amount of liquid dispensed. The dispensing gun 104, shown in FIGS. 21-23, comprises a nozzle 196, a plurality of buttons 198, a plurality of LEDs 200, and a light 202. The plurality of LEDs 200 is used to illuminate the plurality of buttons 198, so that the user can see the selection of beverages available. The plurality of buttons 198 comprises a primary button, a plurality of ancillary buttons, and a plurality of indicators. The primary button is preferably located closer to the nozzle 196 than the plurality of ancillary buttons. The plurality of ancillary buttons is a linear pattern of buttons extending adjacent to the primary button along the dispensing gun 104. The plurality of indicators is a series of alphanumeric characters located on the plurality of buttons that indicate the function of each button. For example, the plurality of indicators may be a set of consecutive numbers, in which each number refers to a different cylinder of the plurality of cylinders 118, and thus potentially a different beverage. This helps a user determine which liquid is going to be dispensed. When the user presses an ancillary button of the plurality of ancillary buttons, the controller receives a signal and tells the appropriate actuator of the plurality of actuators to open, allowing liquid to flow through the primary hose 116 and out of the nozzle 196. In an alternative embodiment, the dispensing gun 104 further comprises a trigger. The trigger allows a user to press an ancillary button of the plurality of ancillary buttons to open an actuator of the plurality of actuators within the flow control unit 188, and then press the trigger to open the nozzle 196 and dispense the liquid. When the user presses the primary button 204, the light 202 activates. The light 202 is either an incandescent bulb, a fluorescent bulb, a halogen bulb, an LED, or another light source known in the art which allows a user to illuminate a given area generally in front of the nozzle 196. The nozzle 196 allows for liquid to flow out of the dispensing gun 104 in an appropriate direction, as dictated by the user. The user aims the nozzle 196 at a target and presses a button of the plurality of buttons 198 to either dispense liquid or to illuminate the area in front of the nozzle 196. Further, a wiring 206 provides power supply to the dispensing gun 104. A hose 208 provides the required beverage to the dispensing gun 104. A battery 210 may provide power when external supply is not available.

In the preferred usage of the beverage dispensing cooler 100, a user acquires the beverage dispensing cooler 100, as well as several two-liter soda bottles 158 or five-liter kegs 160. The user slides the switch 136 on the first lid 108 and opens the first lid 108 to reveal the chamber 112. The user then opens the lid 166 of the plurality of cylinders 118 by unlocking the hinge 172, and inserts an open two-liter bottle 158 or five-liter keg 160 within. The user then closes the lid 166 and presses the quick-connect cap 168 onto the top of the two-liter bottle 158. For a five-liter keg 160, the user screws the quick-connect cap 168 into the keg adapter 170, taps the keg 160, and then attaches the quick-connect cap 168 to the keg 160 using the keg adapter 170. The user fills the chamber 112 with ice 150, being sure that ice the 150 fills the volume around the plurality of cylinders 118. The user then attaches hoses of the plurality of hoses inside the chamber 112. The user first attaches a hose to the gas pressure tank 156 within the plurality of pressure compartments 120, then attaches the other end of that hose to the input nozzle 176 of the quick-connect cap 168, then uses another hose of the plurality of hoses to connect the output nozzle 178 of the quick-connect cap 168 to the appropriate inlet of the plurality of inlets of the flow control unit 188. The user follows these steps until all cylinders of the plurality of cylinders 118 are full, or until there are no more soda bottles (or kegs) to connect. The user then closes the first lid 108, and is ready to begin dispensing beverages. The user pulls the dispensing gun 104 to a convenient height and dispenses a beverage into a cup, glass, or similar container. When finished, the user may release the dispensing gun 104, which will retract back towards the body 106, or the user places the dispensing gun 104 into the dispenser mount 130 using a hanger 131 (shown in FIG. 21) for more convenient storage. To transporting the beverage dispensing cooler 100, the user holds the grip 132 of the handle 102 and pulls the body 106 so that the body 106 is supported by the plurality of wheels 124. The user may adjust the length and angle of the handle 102 to further facilitate this process. To access the containment area 142 of the plurality of trays 138, the user slides the switch 136 across the channel. The user then opens the first lid 108, revealing the tray of the plurality of trays 138 within. To access the container of the second lid 110, the user slides the plurality of ancillary solar panels 154 along the track towards the primary solar panel 152, revealing the contents within.

Although the invention has been explained in relation to its preferred embodiment, it is to be understood that many other possible modifications and variations can be made without departing from the spirit and scope of the invention.

I claim:

1. A beverage dispensing cooler comprising:
   a first lid;
   a second lid;
   a body;
   an axle;
   a handle;
   a plurality of hoses;
   the body comprising a chamber, a panel, a base valve, a wall drain, a primary hose, a flow control unit, a power unit and a dispenser gun;
   the chamber comprising a plurality of cylinders, a plurality of pressure compartments and a basin;
   the basin being configured to collect water from condensation and melted ice;
   the base valve comprising an opening with an adjustable closure for connecting the basin to an exterior of the beverage dispensing cooler;
   the wall drain being configured to allow accumulated water to flow from each of the first lid and the second lid into the basin;
   the axle comprising a plurality of wheels, a rod and a plurality of bearings;

the rod connecting the plurality of wheels together;
the rod running through a width of the body;
the plurality of bearings being connected to the rod and to the plurality of wheels;
the plurality of bearings allowing the plurality of wheels to turn independently of each other;
the handle being configured to facilitate engagement of the beverage dispensing cooler with a hand of a user;
each of the plurality of cylinders comprising a cylindrical body, a cylinder opening, a freeze gel lining, a lid, a quick-connect cap and a keg adapter, the cylinder opening traversing through the cylindrical body, the cylinder opening being adjacently located to the first lid, the opening being configured to enable insertion of a bottle or a keg into the cylindrical body, the freeze gel lining being embedded within the cylindrical body, the lid being configured to accommodate a content within the cylindrical body, the lid comprising a lid body, a hinge and a latch, the hinge and the latch being connected to the lid body, the hinge and the latch being oppositely located to each other along the lid body, the hinge being connected to the cylindrical body so as to allow the lid body to swing open for insertion of the bottle or the keg, the latch being releasably engaged with the cylindrical body so as to secure the lid in a closed position, the quick-connect cap being configured to connect the bottle or the keg inserted into the cylindrical body to the plurality of hoses, the keg adapter comprising an adapter hole, an adapter body, a first adapter end and a second adapter end, the adapter hole penetrating the adapter body, the quick-connect cap being secured into the adapter hole, the first adapter end extending from the adapter body radially outward, the second adapter end extending from the adapter body radially outward, the adapter hole being located in between the first adapter end and the second adapter end, the first adapter end comprising a first lip, the second adapter end comprising a second lip and a curve, the first lip and the second lip each being configured to wrap around an edge of the bottle or the keg, the curve being connected in between the adapter body and the second lip, and the curve allowing for a bend in the keg adapter.

2. The beverage dispensing cooler of claim 1, wherein a wheel of the plurality of wheels comprises retractable spikes configured to increase traction over a surface.

3. The beverage dispensing cooler of claim 1, wherein the plurality of wheels comprises:
a plurality of spike housings disposed over a surface of the plurality of wheels;
a plurality of spikes extending from inside of the plurality of spike housings; and
a button configured to control extension of the plurality of spikes, wherein a first depressing of the button causes the plurality of spikes to extend out from the plurality of wheels, wherein a second depressing of the button causes the plurality of spikes to retract back into the plurality of spike housings.

4. The beverage dispensing cooler of claim 1, wherein the handle comprises:
a first segment comprising a pair of hollow extrusions configured to connect to the body, wherein the first segment comprises:
a hinge connected to the body, wherein the hinge is configured to allow for adjustment of an angle of the handle relative to the body; and
a plurality of holes disposed around each hollow extrusion of the pair of hollow extrusions, wherein the plurality of holes is disposed at a plurality of distances from the hinge;
a second segment configured to telescope out from the first segment, wherein the second segment comprises:
a grip;
a dispenser mount attached to the grip, wherein the dispenser mount is configured to facilitate holding of the dispenser gun;
a plurality of buttons corresponding to the plurality of holes of the first segment, and allows a user to adjust the height of the second segment relative to the first segment, thus giving the handle its telescoping ability.

5. The beverage dispensing cooler of claim 1, wherein the first lid comprises:
a plurality of hinges connected to the body, wherein the plurality of hinges is configured to allow the first lid to hinge open and close;
a plurality of trays configured to fit atop the chamber and beneath a chamber-facing side of the first lid to allow for storage of a food item, wherein the plurality of trays comprise:
a containment area,
a notch cut into the plurality of trays for allowing an interaction of the plurality of trays with a switch
a freeze gel lining disposed within the plurality of trays, wherein the freeze gel lining is configured to cool as a result of exposure to low temperature within the chamber; and
a switch configured to allow opening of the first lid to reveal one of a containment area of the plurality of trays and the chamber.

6. The beverage dispensing cooler of claim 1, wherein the second lid comprises:
a container configured to accommodate a cooling substance, wherein the container comprises:
an opening configured to connect an open volume of the container to the wall drain allowing built-up water to drain into the basin;
a freeze gel lining embedded within walls of the container, wherein the freeze gel lining is configured to maintain a cool temperature within the container;
a track;
a plurality of solar panels configured to supply solar energy to a battery of the power unit, wherein the plurality of solar panels comprises:
a primary solar panel secured into position above the container;
at least one ancillary solar panel attached to the track, wherein the track extends across the top of the container and beneath the primary solar panel to allow the at least one ancillary solar panel to slide under the primary solar panel along the track permitting access to the container; and
a plurality of electrical connections configured to connect the plurality of solar panels to the power unit.

7. The beverage dispensing cooler of claim 1, wherein the plurality of pressure compartments each comprise:
a wall comprising a hole configured to allows access to the gas pressure tank via the plurality of hoses;
a lid comprising a sealed edge configured to seal the lid securely and removably to the plurality of pressure compartments; and a gas pressure tank comprising an adapter configured to allows for separation of pressure into the plurality of cylinders, wherein the adapter comprises:
- a plurality of hose connectors configured to allow for connection of the plurality of hoses to the adapter, and thus allows access to the gas within the gas pressure tank; and
- a valve configured to control pressure released from the gas pressure tank.

8. The beverage dispensing cooler of claim 1, wherein the quick-connect cap comprises:
- an input nozzle comprising a hollow extrusion that allows for connection of the quick-connect cap to the gas pressure tank of the plurality of pressure compartments;
- an output nozzle comprising a hollow extrusion that allows for connection of the quick-connect cap to the flow control unit via the plurality of hoses;
- a tube configured to extend into at least one of the bottle and the keg allowing the liquid within to connect to the input nozzle and the output nozzle; and
- a button configured for allowing the quick-connect cap to releasably snap onto at least one of the bottle and the keg.

9. The beverage dispensing cooler of claim 1, wherein the keg adapter comprises:
- the adapter hole being a threaded hole configured to match with the threading of a threaded exterior of the quick-connect cap, wherein the quick-connect cap is configured to be secured into place by applying appropriate torque to the quick-connect cap.

10. The beverage dispensing cooler of claim 1, wherein the flow control unit comprises:
- a body connected inside the chamber near the first lid and the dispenser gun;
- a plurality of inlets comprising a series of hollow cylindrical extrusions extending from the body of the flow control unit, wherein the plurality of inlets comprises:
  - a lip comprising a ring-shaped extrusion concentric with each inlet of the plurality of inlets that allows for attachment of a hose of the plurality of hoses; and
  - a plurality of actuators comprising a series of actuators configured to open and close in response to receipt of an appropriate signal from the controller;
- an outlet comprising a hollow cylindrical extrusion configured for attachment of the primary hose;
- a controller configured to receive input signals from the dispenser gun through the plurality of electrical connections and convert the input signals into an output signal that determines which actuator of the plurality of actuators is activated; and
- a plurality of electrical connections configured to electrically join the dispenser gun, the controller, the power unit, and the plurality of actuators.

11. The beverage dispensing cooler of claim 1, wherein the power unit comprises:
- at least one battery capable of storing charge for an extended period of time; and
- a battery container configured to allow for connection of the at least one battery to a controller and to the second lid.

12. The beverage dispensing cooler of claim 1, wherein the panel comprises:
- a plurality of USB ports configured to regulate charge from the power unit and configured to engage with a male USB-style charging plug into the panel;
- a plurality of outlets configured to regulate charge from the power unit and configured to engage with a male electrical wall plug into the panel; and
- a door configured to swing open and closed to protect the plurality of USB ports.

13. The beverage dispensing cooler of claim 1, wherein the primary hose comprises:
- a first end configured to connect to the outlet of the flow control unit over the lip of the outlet;
- a second end configured to connect to the dispenser gun; and
- a spool configured to allow the primary hose to wind around itself for storage, wherein the spool comprises a constant-force spring and an extrusion, wherein the extrusion comprises a cylinder that extends across the width of the spool and allows for the primary hose and the constant-force spring to wind up, wherein the constant-force spring attaches to a length of the primary hose, creating a constant force on the primary hose that biases the dispenser gun towards the spool, wherein when released, the dispenser gun retracts back toward the beverage dispensing cooler.

14. The beverage dispensing cooler of claim 1, wherein the dispensing gun comprises:
- a nozzle,
- a plurality of buttons comprising:
  - a primary button,
  - a plurality of ancillary buttons, wherein depressing an ancillary button of the plurality of ancillary buttons activates a corresponding actuator of the plurality of actuators causing liquid from a corresponding cylinder of a plurality of cylinders to flow through the primary hose and out of the nozzle;
  - a plurality of indicators located on the plurality of buttons to indicate a corresponding function of each button,
- a plurality of LEDs configured to illuminate the plurality of buttons; and
- a light configured to illuminate a given area generally in front of the nozzle, wherein the light is activated upon depressing the primary button.

\* \* \* \* \*